United States Patent
Liao et al.

(10) Patent No.: US 12,373,391 B1
(45) Date of Patent: Jul. 29, 2025

(54) DYNAMIC FACET GENERATION USING LARGE LANGUAGE MODELS

(71) Applicant: Dropbox, Inc., San Francisco, CA (US)

(72) Inventors: Wesley Liao, Jersey City, NJ (US); Ermo Wei, Milpitas, CA (US); Aleksander Dash, Redwood City, CA (US); Morgan Zerby, Kirkland, WA (US); Simon Shubbar, Toronto (CA); Prasang Upadhyaya, San Bruno, CA (US); Maor Bar Asher, New York, NY (US); Jiarui Ding, Encino, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/787,759

(22) Filed: Jul. 29, 2024

(51) Int. Cl.
   *G06F 16/16* (2019.01)
   *G06F 21/62* (2013.01)

(52) U.S. Cl.
   CPC .......... *G06F 16/168* (2019.01); *G06F 16/164* (2019.01); *G06F 21/6218* (2013.01)

(58) Field of Classification Search
   CPC ... G06F 16/168; G06F 16/164; G06F 21/6218
   See application file for complete search history.

(56) References Cited

U.S. PATENT DOCUMENTS

| | | | |
|---|---|---|---|
| 8,510,302 B2 * | 8/2013 | Sweeney | G06F 16/35 707/758 |
| 9,037,579 B2 | 5/2015 | Pasumarthi et al. | |
| 9,805,716 B2 | 10/2017 | Lee et al. | |
| 10,614,119 B2 * | 4/2020 | Eleish | G06F 16/51 |
| 10,943,583 B1 | 3/2021 | Gandhe et al. | |
| 11,423,886 B2 | 8/2022 | Gruber et al. | |
| 11,663,442 B2 | 5/2023 | Cella et al. | |
| 11,696,682 B2 | 7/2023 | Tran | |
| 11,720,560 B2 * | 8/2023 | Li | G06N 20/00 707/769 |
| 11,798,535 B2 | 10/2023 | Stoimenov et al. | |
| 11,837,216 B2 | 12/2023 | Chen et al. | |
| 12,112,355 B1 * | 10/2024 | Hanson | G06Q 30/0276 |
| 2009/0249446 A1 * | 10/2009 | Jenkins | G06Q 10/063 707/E17.108 |
| 2010/0049766 A1 | 2/2010 | Sweeney et al. | |
| 2010/0153333 A1 | 6/2010 | Rasmussen et al. | |
| 2012/0054226 A1 * | 3/2012 | Cao | G06F 16/838 707/769 |
| 2013/0166547 A1 | 6/2013 | Pasumarthi et al. | |
| 2016/0034305 A1 * | 2/2016 | Shear | G06F 16/285 707/722 |
| 2017/0060856 A1 * | 3/2017 | Turtle | G06F 16/00 |

(Continued)

*Primary Examiner* — Merilyn P Nguyen
(74) *Attorney, Agent, or Firm* — Keller Preece PLLC

(57) ABSTRACT

The present disclosure is directed toward systems, methods, and non-transitory computer-readable media for generating a dynamic facet by using a large language model. For example, the disclosed systems extract raw facet data from a plurality of content items stored in a content management system. In addition, the disclosed systems determine one or more facet content groups by grouping the plurality of content items according to the raw facet data. Further, the disclosed systems generate a facet prompt from the one or more facet content groups. Moreover, the disclosed systems generate a dynamic facet by providing the facet prompt to a large language model.

20 Claims, 11 Drawing Sheets

(56) References Cited

U.S. PATENT DOCUMENTS

| | | | |
|---|---|---|---|
| 2018/0246969 A1* | 8/2018 | Hind | G06F 16/901 |
| 2022/0100746 A1* | 3/2022 | Chen | G06F 18/2148 |
| 2023/0384916 A1* | 11/2023 | Sadeh | G06F 3/04817 |

* cited by examiner

Facet Prompt 502

<s>[INST]
You are a helpful organizer. You will be given a list of phrases along with their relative importance and you will identify 1-4 main themes. These themes should have a good balance of accuracy, coverage and distinctness.
Return the answer in a json format where the key is the theme and the value list of the most prominent relevant phrases.
If no obvious theme is identifiable then return an empty json "{}".

For example, given phrases
[{"Sales doc draft": 2, "2023FY sales": 4, "Budget Spreadsheet": 3, "previous budget jan": 4}]
[/INST]
{{
"Sales": ["Sales doc draft", "2023FY sales", "sales budget jan"],
"Budget": ["Budget Spreadsheet", "previous year budgeting", "sales budget jan"]
}}
</s>

Remember, only up to 4 themes, each of which contain 5 or fewer phrases. Keep to the most prominent themes and phrases only.
Also return the JSON mapping ONLY and no other text.
[INST] (input_string) [/INST]

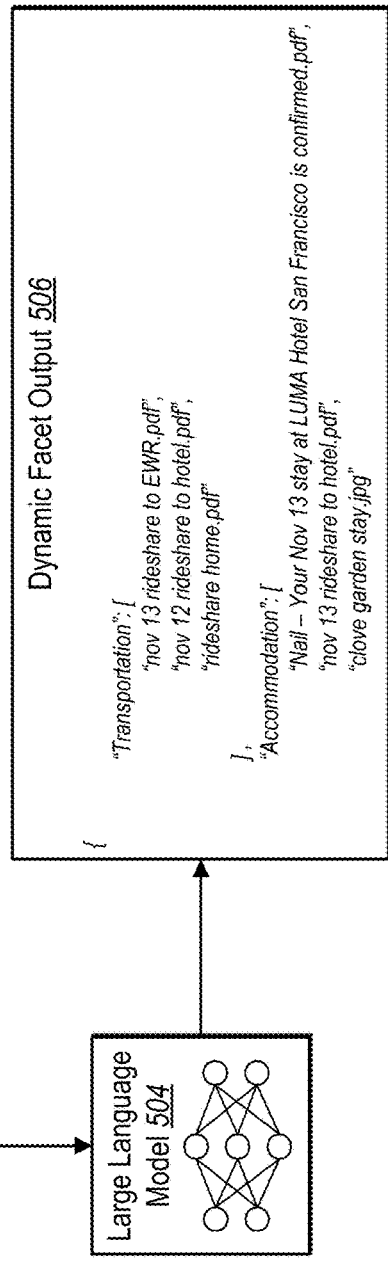

Dynamic Facet Output 506

{
 "Transportation": [
  "nov 13 rideshare to EWR.pdf",
  "nov 12 rideshare to hotel.pdf",
  "rideshare home.pdf"
 ],
 "Accommodation": [
  "Nall – Your Nov 13 stay at LUMA Hotel San Francisco is confirmed.pdf",
  "nov 13 rideshare to hotel.pdf",
  "clove garden stay.jpg"
 ]
}

Large Language Model 504

*Fig. 5*

DYNAMIC FACET GENERATION USING LARGE LANGUAGE MODELS

BACKGROUND

Advancements in computing devices and networking technology have given rise to a variety of innovations in creating content management platforms to manage and store digital content. Over time, existing systems provide various digital content organization tools. For instance, existing systems provide pre-defined filters to narrow down a large volume of digital content to a specific set of digital content. Despite these advances, however, existing systems continue to suffer from a number of disadvantages, particularly in terms of accuracy, efficiency, and operational flexibility.

As just mentioned, existing content management platforms suffer from various inaccuracies. For example, existing content management platforms provide pre-defined filters to narrow down content. Moreover, existing content management platforms typically create pre-defined filters based on popular categories such as recently viewed content or images. The pre-defined filters of existing content management platforms are often so broad or generic that they are unhelpful in locating or navigating a large volume of digital content. In other words, existing content management platforms are not precise and lack accuracy in helping a user of a client narrow down a large volume of content.

Additionally, some existing content management platforms attempt to counter this by creating filters based on the digital content stored on the content management platforms. However, these attempts often suffer from inaccuracies due to the filters being created from generic information. Thus, this often results in a "tailored" filter that accesses content items that do not accurately align to the tailored filter. In other words, existing content management platforms are unable to create accurate custom filters for a collection of digital content.

Due to the various inaccuracies of existing content management platforms, existing content management platforms further suffer from various inefficiencies. For example, due to the inaccurate filters (e.g., inaccurate due to the unhelpful nature of broad or generic filters or due to the inaccurate nature of tailored filters), existing content management platforms require excessive navigation and shuffling between interfaces to locate one or more digital content items. Specifically, a user of a client device may select a predefined filter to attempt to locate a content item, determine that the content item is not found by the predefined filter, and select another predefined filter. Accordingly, existing content management platforms consume a lot of time and resources in creating and using filters that are not necessarily useful, which in turn causes users of client devices to navigate back-and-forth through various graphical user interfaces.

Relatedly, existing content management platforms also suffer from operational inflexibilities. As alluded to above, existing content management platforms are limited to creating broad/generic filters or tailored filters that are highly inaccurately. As a result, existing content management platforms are rigidly confined to providing organization tools that may only be helpful for a smaller volume of digital content. Moreover, existing content management platforms are inconsistent in how useful they are in filtering down a large volume of digital content.

SUMMARY

This disclosure describes one or more embodiments of systems, methods, and non-transitory computer-readable storage media that provide benefits and/or solve one or more of the foregoing and other problems in the art. For instance, the disclosed systems generate a dynamic facet (e.g., a filter created on-the-fly) for a content management system by using a large language model. Specifically, the disclosed systems extract raw facet data from a plurality of content items stored in a content management system. The system then determines one or more facet content groups according to the extracted raw facet data. Moreover, the disclosed systems generate a dynamic facet by generating a facet prompt using the one or more facet content groups and providing the facet prompt to a large language model. In response to receiving the facet prompt, the large language model and provide the dynamic facet as output.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIG. 5 illustrates an example diagram of the dynamic facet system generating a facet prompt and using a large language model to generate a dynamic facet in accordance with one or more embodiments;

DETAILED DESCRIPTION

Figure 1:
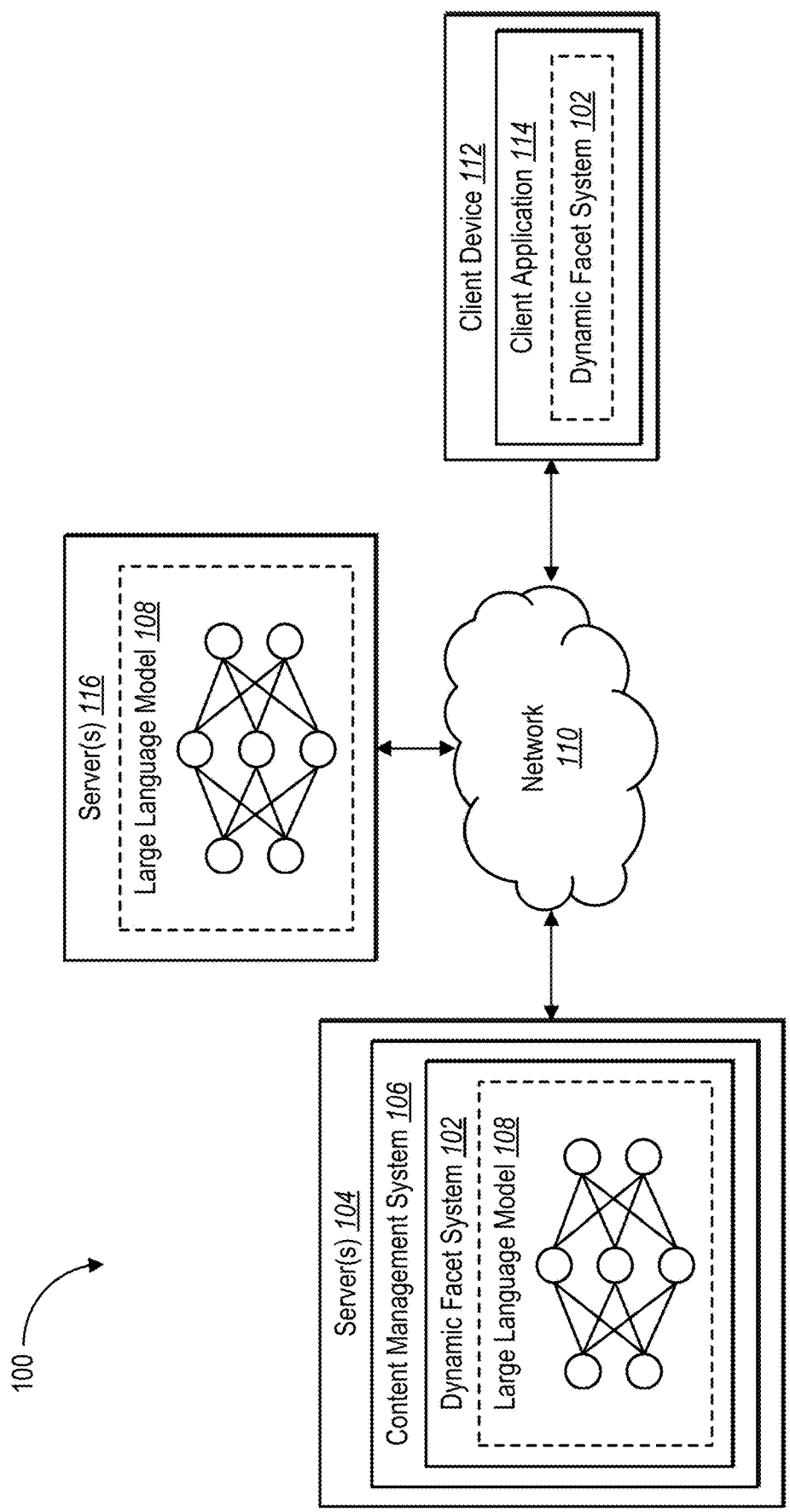
FIG. 1 illustrates a schematic diagram of an example environment of a dynamic facet system in accordance with one or more embodiments.

This disclosure describes one or more embodiments of a dynamic facet system that improves the speed and accuracy of generating dynamic facets (e.g., filters) through the use of machine learning (e.g., large language models). For example, the dynamic facet system generates a dynamic facet by performing pre-processing steps to generate a prompt from folder or subfolder content stored in the content management system. Specifically, pre-processing indicates steps performed before a search/browse is performed by a client device. In other words, the dynamic facet system performs pre-processing steps in response to a user of a client device navigating the content management system (e.g., selecting a folder or sub-folder to view the digital content of that folder or sub-folder). For instance, the dynamic facet system performs the pre-processing steps to create one or more dynamic facets and provides for display the one or more dynamic facets in a graphical user interface for a user of a client device to view. Additionally, the dynamic facet system can also perform post-processing steps, which will be discussed further below.

As part of the pre-processing steps, the dynamic facet system extracts raw facet data based on various metrics/data associated with content items. For example, the dynamic facet system can extract raw data categories, such as determined topics based on content (e.g., by processing an image or content item with a machine learning model to determine a class/category of the content item), keywords in content, access patterns, operations performed on content items, storage locations, filenames, file types, creator accounts, associated users/groups/teams, and/or other data. For instance, the raw data categories contain raw facets such as "John Smith," "PDF file," "hotel by the seaside," or "John shared with Alice on Jul. 4, 2024," or any other term or metadata that represents a characteristic of a content item. The dynamic facet system can further generate raw facet content groups (e.g., raw facets mapped to content items) that correspond to a specific content collection and that the dynamic facet system can use to generate an accurate representation of context associated with digital content items stored in the specific content collection.

As part of the pre-processing steps, the dynamic facet system can generate facet content groups by grouping content items based on the extracted raw facet data. For example, the dynamic facet system groups content items by deduping (e.g., collapsing duplicates such as combining dog, dogs, and puppy into a single category), sorting, and creating a mapping defining the relationships among the digital content items and the raw facet data. Additionally, the pre-processing steps include the dynamic facet system counting the digital content items in each facet content group and ranking them by how well a particular facet content group bisects the total population of content items in a given collection of content items. For instance, the dynamic facet system can identify facet content groups that fall within an optimal range of the content collection population (e.g., 30%-60%). From the ranking, the dynamic facet system can select a subset of the facet content groups.

In one or more embodiments, the dynamic facet system formats the selected subset of facet content groups (e.g., top k facets) into text for a large language model prompt, where the prompt includes a text version of each facet from the subset of facet content groups along with an instruction to generate groupings of facets. In other words, the dynamic facet system leverages the large language model to more intelligently generate groupings/abstractions (e.g., dynamic facets) for the identified facet content groups. In doing so, the dynamic facet system more accurately and efficiently creates custom dynamic facets to assist a user of a client device in having a seamless navigation to locate one or more content items within a given collection of content. In other words, the dynamic facets are generated from characteristics of a specific collection of content and are intelligently selected to efficiently locate content within the specific collection (e.g., content within a folder).

As mentioned above, the dynamic facet system also performs post-processing steps. For example, the dynamic facet system can perform post-processing steps to perform a permissions check on content items included mapped to a dynamic filter (to verify whether a user account can access them), to use the pre-processing mapping to reverse to a theme/topic-to-content-item mapping, and to refine dynamic filters based on various factors (e.g., offensive word removal or removing a group if more than a threshold amount (e.g., 50%) of included content items are backup files, or other uninteresting/uninformative files).

As suggested above, the dynamic facet system can provide several improvements or advantages over existing systems. In one or more embodiments, the dynamic facet system improves accuracy relative to conventional systems. As mentioned above, conventional systems suffer from accuracy issues because they resort to pre-defined filters (e.g., that are often too broad or generic) and "tailored" filters that often do not accurately correspond to a given collection of content items. In contrast, the dynamic facet system creates dynamic facets that are accurately tailored to a collection of content items within a user account. For instance, when a user opens a folder of content in the content management system, the dynamic facet system extracts raw facet data from a plurality of content items stored within the folder of the user account, determines facet content groups, generates a facet prompt for one or more of the facet content groups, and generates a dynamic facet by providing the facet prompt to a large language model. In other words, the dynamic facet system leverages granular data (e.g., the extracted raw facet data) to accurately determine a group of facets corresponding to the accessed content items, and in addition, they dynamic facet system further leverages a large language model to generate a dynamic facet that includes an optimal amount of digital content items and relevant facet content groupings (e.g., the dynamic facets are not too broad or generic relative to the pre-defined filters in conventional systems).

In addition to generating accurate dynamic facets that specifically correspond to a unique collection of content items, the dynamic facet system selects and utilizes a subset of dynamic facets that will lead to efficiently locating content items within the specific collection of content items. Indeed, the dynamic facet system determines which potential facet content groups provide a predefined bisection (e.g., an optimal bisection) of the specific collection of content items, ensuring that if a dynamic facet is selected by a user, then the dynamic facet is mapped with an appropriate number of content items to effectively and efficiently pair down the collection. In other words, unlike traditional systems that provide filters that may be overly broad (e.g., a vast majority of content items in a collection correspond to a particular filter, thus providing no filter benefit), or may provide filters that are overly narrow (e.g., only a single content item in a collection relates to a particular filter), the dynamic facet system identifies and selects dynamic facets to optimize navigation and location of content within a specific collection of content items.

Along similar lines, the dynamic facet system further improves upon efficiency relative to traditional systems. As mentioned above, traditional systems suffer from excessive navigation and shuffling between interfaces of a content management platform to locate one or more content items. In contrast, the dynamic facet system accurately generates dynamic facets that are informative and relevant to a user of a client device which minimizes or reduces the number of navigations throughout a content management system. In other words, the dynamic facet system efficiently provides organization tools (e.g., the dynamic facets) to a client device on-the-fly and based on specific content that the client device is accessing, which allows a user to quickly navigate to the desired content items. Thus, the dynamic facet system improves the graphical user interface of content management platforms such that a user of a client device does not have to aimlessly or inaccurately move between numerous interfaces to locate a desired content item. In other words, the dynamic facet system improves the efficiency of graphical user interfaces by reducing the number of navigation steps needed to locate a content item relative to traditional systems.

In addition, the dynamic facet system 102 creates and displays the dynamic filters in a graphical user interface of a client device in a near simultaneous manner (e.g., real-time or near real-time). In doing so, the dynamic facet system 102 more effectively provides organization tools to a user of a client device as the client device is navigating through different parts of the content management system 106. Thus, the dynamic facet system 102 is effective and responsive in creating tailored dynamic facets for a collection of content items in the moment the collection is being accessed by a client device.

Moreover, related to the efficiency and accuracy improvements, the dynamic facet system also improves upon operational flexibility. For example, the dynamic facet system is not rigidly confined to providing pre-defined filters or inaccurate tailored filters. Rather, the dynamic facet system can adjust to creating dynamic filters (e.g., on-the-fly filters) to adapt to a specific collection of content items. For instance, the dynamic facet system can adapt to a large volume of content items and create dynamic filters that accurately filter down a large volume of content items to specific topics. In doing so, the dynamic facet system creates a consistent operational tool that is both responsive and relevant to a specific collection of content items.

Additional detail regarding the dynamic facet system will now be provided with reference to the figures. For example, FIG. 1 illustrates a schematic diagram of an example system environment for implementing a dynamic facet system 102 in accordance with one or more implementations. An overview of the dynamic facet system 102 is described in relation to FIG. 1. Thereafter, a more detailed description of the components and processes of the dynamic facet system 102 is provided in relation to the subsequent figures.

As shown, the environment 100 includes server(s) 104 with a content management system 106 and the dynamic facet system 102, server(s) 116, and a client device 112. Each of the components of the environment can communicate via the network 110, and the network 110 may be any suitable network over which computing devices can communicate. Example networks are discussed in more detail below in relation to FIGS. 9-10.

As mentioned above, the example environment includes client device 112. The client device 112 can be one of a variety of computing devices, including a smartphone, a tablet, a smart television, a desktop computer, a laptop computer, a virtual reality device, an augmented reality device, or another computing device as described in relation to FIGS. 9-10. The client device 112 can communicate with the server(s) 104 via the network 110. For example, the client device 112 can receive user input from a user interacting with the client device 112 (e.g., via the client application 114) to, for instance, generate, using a large language model, one or more dynamic facets that is relevant to a collection of content items of the client device 112. In addition, the dynamic facet system 102 on the server(s) 104 can receive information relating to various interactions with content items and/or user interface elements based on the input received by the client device 112.

As shown, the client device 112 can include a client application 114. In particular, the client application 114 may be a web application, a native application installed on the client device 112 (e.g., a mobile application, a desktop application, etc.), or a cloud-based application where all or part of the functionality is performed by the server(s) 104. Based on instructions from the client application 114, the client device 112 can present or display information, including a user interface for interacting with content items stored on the content management system 106. Using the client application 114, the client device 112 can perform (or request to perform) various operations, such as accessing one or more content items and/or selecting a dynamic facet.

As illustrated in FIG. 1, the example environment also includes the server(s) 104. The server(s) 104 may generate, track, store, process, receive, and transmit electronic data, such as interactions with interface elements, interactions between user accounts or client devices, raw facet data of content items stored on the content management system, dynamic facets (e.g., created in the past), additional dynamic facets created in response to selecting a dynamic facet, and facet content groups (e.g., mappings between facet content groups and content items). For example, the server(s) 104 may receive an indication from the client device 112 of a user interaction such as a user selecting a folder to view. In addition, the server(s) 104 can transmit data to the client device 112 in the form of a dynamic facet to display on a graphical user interface of the client device 112. Indeed, the server(s) 104 can communicate with the client device 112 to send and/or receive data via the network 110. In some implementations, the server(s) 104 comprise(s) a distributed server where the server(s) 104 include(s) a number of server devices distributed across the network 110 and located in different physical locations. The server(s) 104 can comprise one or more content servers, application servers, container orchestration servers, communication servers, web-hosting servers, machine learning server, and other types of servers.

As shown in FIG. 1, the server(s) 104 can also include the dynamic facet system 102 as part of the content management system 106. The content management system 106 can communicate with the client device 112 to perform various functions associated with the client application 114 such as managing user accounts, storing and synchronizing content items, facilitating collaboration among user accounts, extracting raw facet data, and providing for display various dynamic facets. Indeed, the content management system 106 can include a network-based smart cloud storage system to manage, store, and maintain content items and related data across numerous user accounts. In some embodiments, the dynamic facet system 102 and/or the content management system 106 utilize a database to store and access information such as content items, raw facet data of content items stored on the content management system, dynamic facets (e.g., created in the past), additional dynamic facets created in response to selecting a dynamic facet, and facet content groups (e.g., mappings between facet content groups and content items).

As further illustrated, the environment includes the server(s) 116 that hosts a large language model 108. In particular, the large language model 108 communicates with the server(s) 104, the client device 112, and/or a database. For example, the dynamic facet system 102 provides a facet prompt to the large language model 108 to create one or more dynamic facets. Indeed, the large language model 108 can include a machine learning model powered by neural networks or other machine learning architectures for generating responses to intent queries. For example, the large language model 108 can refer to a GPT model that generates computer-executable code segments for creating the dynamic facets that include groups of content items.

Although FIG. 1 depicts the dynamic facet system 102 located on the server(s) 104, in some implementations, the dynamic facet system 102 may be implemented by (e.g., located entirely or in part on) one or more other components of the environment. For example, the dynamic facet system 102 may be implemented by the client device 112 and/or a third-party system. For example, the client device 112 and/or a third-party system can download all or part of the dynamic facet system 102 for implementation independent of, or together with, the server(s) 104.

In some implementations, though not illustrated in FIG. 1, the environment may have a different arrangement of components and/or may have a different number or set of components altogether. For example, the client device 112 may communicate directly with the dynamic facet system 102, bypassing the network 110. In some cases, the server(s) 104 and/or the client device 112 can host or house all or part of the large language model 108. As shown, the server(s) 116 house the large language model 108.

Figure 2:
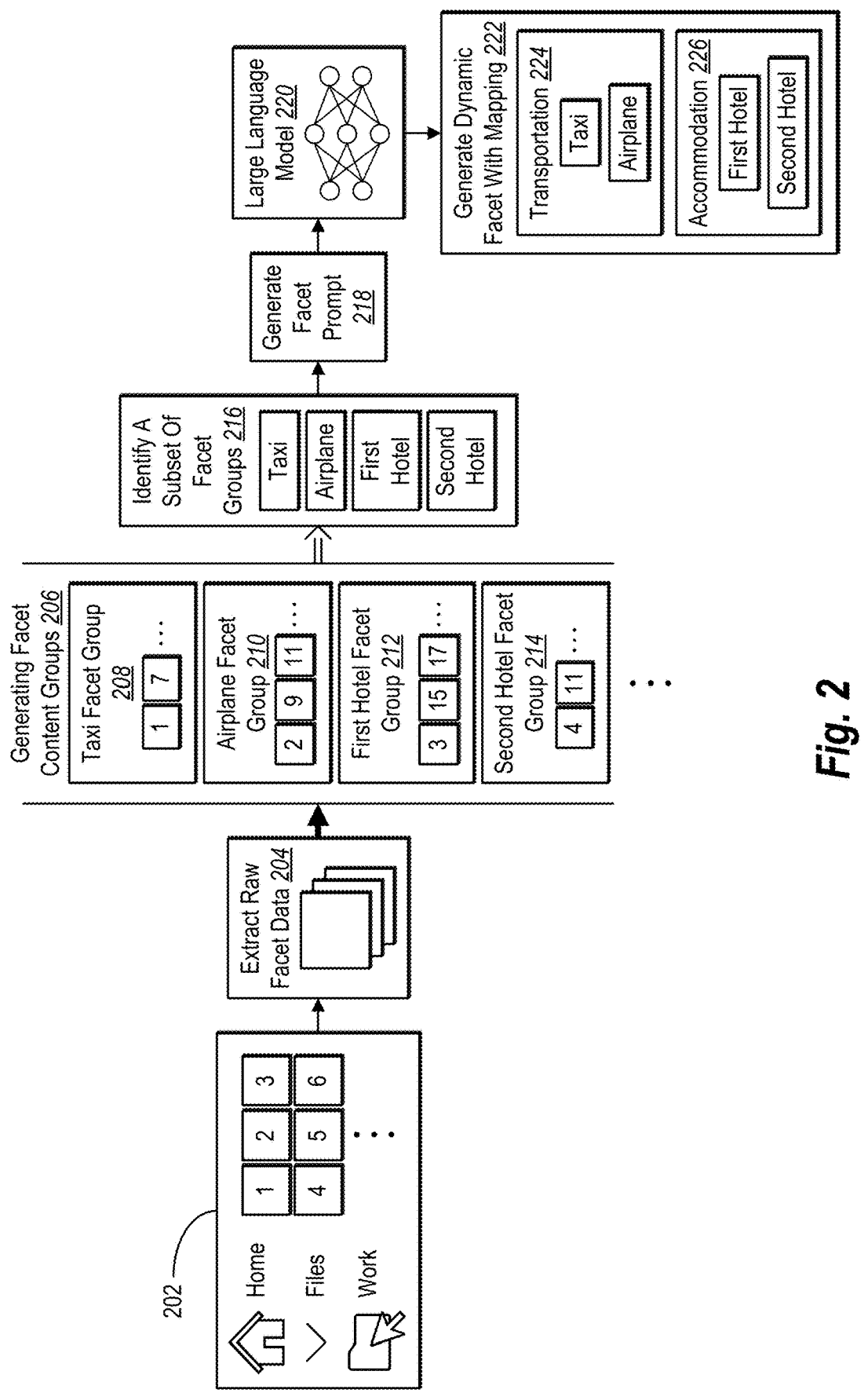
FIG. 2 illustrates an example overview of the dynamic facet system generating a dynamic facet with mapping to content items stored in a content management system in accordance with one or more embodiments.

As mentioned above, the dynamic facet system 102 generates one or more dynamic facets that are relevant and useful for a specific collection of content items stored on the content management system 106. FIG. 2 illustrates the dynamic facet system 102 generating a dynamic facet with mapping to content items using a large language model in accordance with one or more embodiments.

FIG. 2 illustrates an interaction 202 with the content management system 106, such as a client device selecting/navigating to one or more locations within the content management system 106. As shown in FIG. 2, the interaction 202 illustrates a client device selecting a "work" folder and upon selection of the "work" folder, the dynamic facet system 102 performs the steps shown in FIG. 2. For instance, FIG. 2 shows that the "work" folder includes a plurality of content items stored on the content management system 106.

As used herein, "a content management system" refers to a set of software applications that facilitate the storage, access, creation, modification, and organization of digital content items. For example, the content management system 106 provides a central point to manage a plurality of content items that contain text files, image files, video files, audio files and various types of documents. In one or more embodiments, the content management system 106 contains a large volume of data and the dynamic facet system 102, via the content management system 106, further provides dynamic facets to organize the large volume of data. In particular, in response to a navigation through folders in the content management system 106 (e.g., receiving an indication of a user of a client device selecting a folder), the dynamic facet system 102 can generate one or more dynamic facets that are contextually relevant to the navigation action.

As used herein, "a folder" refers to an organizational unit within the content management system 106 to store and manage various types of content (e.g., text files, image files, video files, audio files and various types of documents). Specifically, the content management system 106 can contain folders which structures the digital content in a hierarchical manner, making it easier for a user of a client device to navigate, categorize, and manage the content management system 106.

As used herein, the term "content item" refers to a digital object or a digital file that includes information interpretable by a computing device (e.g., a client device) to present information to a user. A content item can include a file such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents. digital images, digital videos, or digital audio files). In some cases, a content item can refer to a remotely stored (e.g., cloud-based) item or a link (e.g., a link to a cloud-based item or a web-based content item) and/or a content clip that indicates (or links) a discrete selection or segmented sub-portion of content from a webpage or some other content item or source. A content item can be editable or otherwise modifiable and can also be sharable from one user account (or client device) to another. In some cases, a content item is modifiable by multiple user accounts (or client devices) simultaneously and/or at different times. For instance, the plurality of content items can refer to content items accessed via a specific folder of the content management system.

As shown in FIG. 2, the dynamic facet system 102 performs an act 204 of extracting raw facet data. Specifically, the dynamic facet system 102 extracts the raw facet data from the content items that are part of the "work" folder. As used herein, the term "raw facet data" refers to data associated with each content item of a plurality of content items in a group of content items. Specifically, the dynamic facet system 102 extracts raw facet data from the plurality of content items (e.g., stored in the content management system 106) to perform one or more downstream actions (e.g., generate facet content groups). For example, the raw facet data refers to data packets part of the plurality of content items such as metadata tags, access data packets, operation data packets, a subfolder location, word combinations, and a file type. Moreover, the dynamic facet system 102 can extract any combination of raw facet data from a single content item. In some embodiments, the dynamic facet system 102 can extract different types of facet data for different file types.

As further shown in FIG. 2, the dynamic facet system 102 performs an act 206 of generating facet content groups. As used herein, the term "facet content group" refers to a grouping of a plurality of content items according to raw facet data. Specifically, the dynamic facet system 102 extracts the raw facet data from the plurality of content items and determines facet content groups of the content items. In other words, the dynamic facet system 102 determines facet content groups from the raw facet data and maps content items to the facet content groups. As shown, the dynamic facet system 102 generates the facet content groups that include a taxi facet content group 208, an airplane facet content group 210, a first hotel facet content group 212, a second hotel facet content group 214 and additional facet content groups not shown. Moreover, as shown, the taxi facet content group 208 includes content items "1" and "7," the airplane facet content group 210 includes content items "2," "9," and "11," the first hotel facet content group 212 includes content items "3," "15," and "17," and the second hotel facet content group 214 includes content items "4" and "11."

Moreover, FIG. 2 shows the dynamic facet system 102 performing an act 216 of identifying a subset of facet content groups. As mentioned above, the dynamic facet system 102 can rank the generated facet content groups and rank them according to how well they bisect the total content item population. As shown, the dynamic facet system 102 can identify a subset that includes the taxi facet content group, the airplane facet content group, the first hotel facet content group and the second hotel facet content group.

As shown, after identifying the subset of facet content groups, the dynamic facet system 102 can further perform an act 218 of generating a facet prompt. As used herein, the term "facet prompt" refers to a set of instructions for a large language model to determine one or more dynamic facets that include a plurality of content items. Specifically, as mentioned above, the dynamic facet system 102 identifies a subset of the facet content groups (e.g., according to the ranking) and then creates a prompt that includes instructions to generate one or more dynamic facets according to the subset of facet content groups.

In addition, the dynamic facet system 102 can provide the generated facet prompt to a large language model 220. In one or more embodiments a "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks). In addition, and as shown in FIG. 2, the machine learning mode can be a large language model.

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a large language model, a graph neural network, a diffusion neural network, or a multi-layer perceptron. In some embodiments, a neural network includes a combination of neural networks or neural network components.

In one or more embodiments, a large language model includes one or more artificial intelligence models capable of processing and generating natural language text. In particular, large language models are trained on large amounts of data to learn patterns and rules of language. As such, large language models post-training is capable of generating text similar in style and content to input data. As used herein, the term "large language model" includes or refers to one or more neural networks capable of processing natural language text to generate outputs that range from predictive outputs, analyses, or combinations of data within stored content items. In particular, a large language model can include parameters trained (e.g., via deep learning) on large amounts of data to learn patterns and rules of language for summarizing and/or generating digital content. Examples of large language model include BLOOM, Bard AI, ChatGPT, LaMDA, DialoGPT, DropboxGPT, and Dropbox FileGPT.

As shown in FIG. 2, from providing the facet prompt to the large language model 220 (e.g., often the initially generated facet content groups do not have enough abstraction, so the large language model 220 improves the level of abstraction for the facet content groups), the dynamic facet system 102 can further perform an act 222 of generating a dynamic facet with mapping. As used herein, the term "dynamic facet" refers to a customized filter that corresponds to a specific collection of content items. A dynamic facet is associated with multiple facet content groups, with each facet content group having raw facet data associated with one or more content items. Thus, a dynamic facet maps to the content items associated with each of the multiple facet content groups corresponding to the dynamic facet. In one embodiment, in response to navigating to a specific interface in the content management system 106 (e.g., clicking into a specific folder), the dynamic facet system 102 generates a dynamic facet and provides for display the dynamic facet in the specific interface of the content management system 106. A user can then select they dynamic facet to quickly access the content items associated with each of the multiple facet content groups corresponding to the dynamic facet.

Additionally, in response to receiving a selection of the dynamic facet, the dynamic facet system 102 causes the specific interface to transition to an additional interface that displays all the content items associated with the dynamic facet. As shown in FIG. 2, the dynamic facet with mapping shows that from the identified subset of facet content groups (e.g., taxi, airplane, first hotel, and second hotel) the dynamic facet system 102 (e.g., via the large language model 220) generates a dynamic facet of transportation 224 and a dynamic facet of accommodation 226. Specifically, the transportation dynamic facet includes the taxi facet content group 208 and the airplane facet content group 210. Thus, the transportation dynamic facet includes content items "1," "7," "2," "9," and "11." Moreover, the accommodation dynamic facet includes the first hotel facet content group 212 and the second hotel facet content group 214. Thus, the accommodation dynamic facet includes content items "3," "15," "17," "4," and "11."

In one or more embodiments, the dynamic facet system 102 leverages the large language model 220 to create more relevant and useful groupings. For instance, rather than just relying on the generated facet content groups, the dynamic facet system 102 generates a facet prompt that includes a subset of the facet content groups and further provides the facet prompt to the large language model 220 to generate one or more dynamic facets with mapping to content items. As mentioned above, the dynamic facets group together various facet content groups (e.g., taxi and airplane) in a more efficient and accurate manner relative to conventional systems.

As mentioned above, the dynamic facet system 102 extracts raw facet data from content items to generate various facet content groups. As shown, FIG. 3 illustrates the dynamic facet system 102 creating a mapping between multiple facet content groups and various content items in accordance with one or more embodiments.

Figure 3:
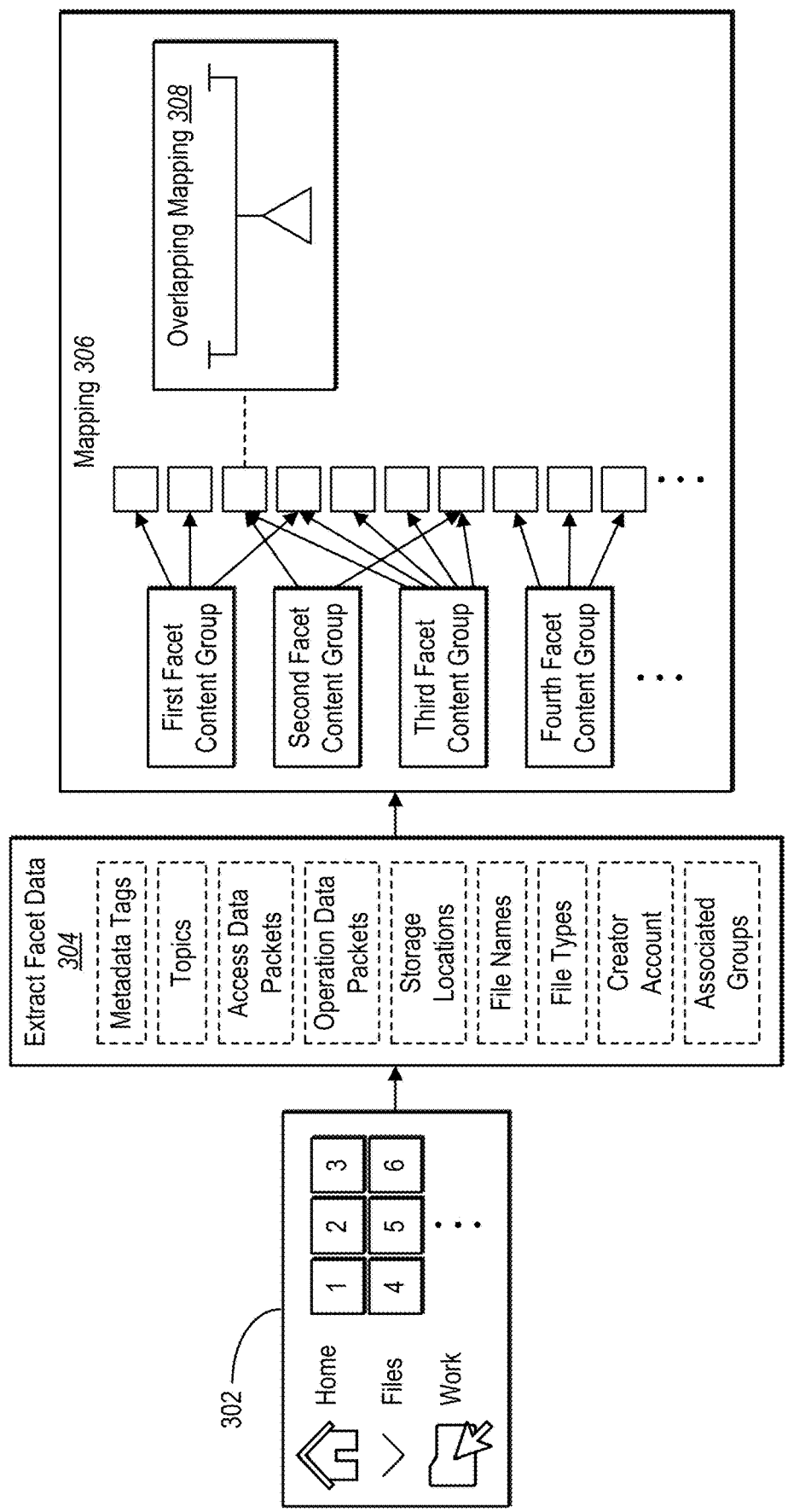
FIG. 3 illustrates an example diagram of the dynamic facet system extracting facet data and mapping content items to determined facet content groups in accordance with one or more embodiments.

As shown in FIG. 3, in response to an interaction 302 of navigating to an interface of the content management system 106 (e.g., a client device selecting a specific folder), the dynamic facet system 102 can perform an act 304 of extracting facet data (e.g., using one or more machine learning models). Extracting raw facet data is the process to identify potential facets by analyzing content items within a collection of content items. In some cases, a raw facet is the same as the extracted facet data (e.g., the extracted facet data is a keyword, and the raw facet is the keyword). In other cases, the raw facet is based on the extracted facet data (e.g., the extracted facet data is an access log indicating the content item was accessed at a specific day/time by the user and the raw facet is "recently accessed").

As shown in FIG. 3, in some embodiments, the dynamic facet system 102 can extract metadata tags from one or more content items relevant to the interaction 302. As used herein, the term "metadata tag" refers to a piece of data associated with a content item that describes the context, structure, and additional attributes of the content item. For instance, the metadata tag can refer to a data packet that includes details about a content item's title, author, creation date, and keywords/key phrases associated with the content item.

Moreover, in some embodiments, the dynamic facet system 102 can extract topics of the content items relevant to the interaction 302. As used herein, the term "topic" can refer to a category of the content item included in the metadata tag. Specifically, the topic can include a description of the subject matter of a content item, such as cat, dog, plant, and food. For instance, the dynamic facet system 102 can utilize a machine learning model to process the content item and determine a topic of the content item (e.g., identify an image class using a machine learning classification model).

As used herein, the term "machine learning classification model" refers to a model trained to generate classifier tags/predictions based on features within a content item. Specifically, the dynamic facet system 102 trains the machine learning classification model by using the model to generate classification prediction(s) using the features within the content items (e.g., and comparing the generated prediction against a ground truth). The dynamic facet system 102 can utilize a variety of machine learning classification models, including decision trees, support vector machines, or neural networks (e.g., deep neural networks/convolutional neural networks).

Further, in some embodiments, the dynamic facet system 102 can extract access data packets of the content items relevant to the interaction 302. As used herein, the term "access data packet" refers to a data packet that indicates one or more client devices that have accessed the content item. Specifically, the dynamic facet system 102 can access activity data associated with the content item that includes viewing the content item, opening the content item, and sharing the content item. Moreover, the dynamic facet system 102 can record a client device identifier or a user account identifier that accessed the content item as part of the access data packet.

In addition, in some embodiments, the dynamic facet system 102 can extract operation data packets relevant to the interaction 302. As used herein, the term "operation data packet" refers to a data packet that indicates one or more operations performed on the content item. Specifically, the operations can include editing, opening, viewing, sharing, renaming, and moving a content item to a different file location. For instance, the operation of editing can include specific changes to a content item such as deleting a word, adding a word, giving access to another user account, changing properties of an image, editing a digital video, etc.

As also shown, in some embodiments, the dynamic facet system 102 can extract the storage locations of content items. For instance, the "storage locations" refers to a specific place in the content management system 106 where a content item is stored. In some instances, rather than the storage location, the dynamic facet system 102 can extract a subfolder location. As used herein, the term "subfolder location" refers to a folder within another folder in the content management system 106. Specifically, the dynamic facet system 102 tracks the nested structure of the content management system 106 and a subfolder location of a content item (e.g., in addition to tracking the folder location).

As further shown, in some embodiments, the dynamic facet system 102 extracts file names and/or file types. As used herein, the "file name" refers to a unique identifier assigned to a file when the content item is created. In some embodiments, the dynamic facet system 102 can also extract word combinations. As used herein, the term "word combination" refers to text used in a file name for a content item. Specifically, the dynamic facet system 102 extracts a combination of words that indicate one or more categories of the content item. For instance, the dynamic facet system 102 can extract a word combination of dogs and cats for a content item that depicts or is related to both dogs and cats.

As used herein, the term "file type" refers to a file format of a content item. Specifically, the file type can include an image type file (e.g., .jpg, .png, .gif, etc.), a document type file (e.g., .txt, .docx, .pdf, etc.), an audio type file (e.g., .mp3, .wav, etc.), a video type file (e.g., .mp4, .avi, etc.), a data type file (e.g., .csv, .xml, json, etc.), a compressed file (e.g., .zip, etc.), and an executable file (e.g., .exe., etc.).

Moreover, in some embodiments, the dynamic facet system 102 extracts creator account and/or associated groups. As used herein, the term "creator account" refers to a user account that created the content item. For instance, the creator account can include data that points to a specific identifier of a user account and/or a specific identifier for a client device using the user account. As used herein, the term "associated groups" refers to a team or category that the content item is associated with. For instance, the associated groups can include engineering, marketing, design, and product.

In one or more embodiments, the dynamic facet system 102 utilizes one or more machine learning models to perform the act 304 of extracting facet data from the content items relevant to the interaction 302. Specifically, the dynamic facet system 102 can utilize a machine learning model specifically trained for detecting topics of a content item or key words of a content item. For instance, the dynamic facet system 102 can utilize the machine learning model to create tokens of the internal content of a content item, create a collection of words that indicates a frequency distribution of the words, calculate the importance of a word in a document relative to a collection of documents, and generate an indication of key words or a topic of the content item.

As alluded to above, in some embodiments, the dynamic facet system 102 can extract one or more combinations of the raw facet data shown in FIG. 3. In some embodiments, the dynamic facet system 102 can first determine a file type of a content item relevant to the interaction 302. For instance, from determining the file type is an image, the dynamic facet system 102 can further extract topics, access data packets, operation data packets, storage locations, and associated groups. Moreover, in some embodiments, the dynamic facet system 102 can determine that the file type of a content item is a text file. In response, the dynamic facet system 102 can further extract key words of the text file, metadata tags, storage locations, and a creator account. In other words, in some embodiments, the dynamic facet system 102 can have one or more pre-established raw facet extraction strategies for specific types of files.

In some embodiments, the dynamic facet system 102 can first extract a file name of the content items relevant to the interaction 302 and then further determine what raw facet data types to extract. In other words, the dynamic facet system 102 can utilize any order of extracting a type of raw facet data to then determine a subsequent type of raw facet data to extract. In some embodiments, the dynamic facet system 102 can extract all types of raw facet data available for the content items relevant to the interaction 302.

As shown in FIG. 3, the dynamic facet system 102 can further perform an act 306 of mapping. As used herein, the term "mapping" refers to the dynamic facet system 102 associating a content item with a facet content group. Specifically, the dynamic facet system 102 generates a mapping for the facet content groups to the content items by assigning a first content item with a first facet content group based on identifying the first content item of the plurality of content items corresponds to the first facet content group. For example, the dynamic facet system 102 determines that a content item conforms with the first facet content group more than other facet content groups and assigns the first content item to the first facet content group.

To illustrate, in some embodiments, the dynamic facet system 102 can generate a first facet content group of "quarterly budget," a second facet content group of "monthly expense report," a third facet content group of "financial forecast" and a fourth facet content group of "Q1 budget review" (e.g., based on the extracted raw facet data). For instance, as part of the mapping, the dynamic facet system 102 utilizes the extracted facet data from the content items relevant to the interaction 302.

Specifically, the extracted facet data can include the following: 1) a first content item with a topic of Bob Smith budget, an associated group of accounting, a creator account of Jennifer Johnson, access data packets of Bob Smith and Jennifer Johnson, and operation data packets of editing permissions locked; 2) a second content item with a topic of Jimmy Davis budget, associated group of engineering, sub-folder location of engineering budget reports, a file type of spreadsheet, and an associated group of accounting; 3) a third content item with a topic of executive reports, operation data packets of edited by executive assistant, access data packets of Dave Smith CEO, Jennifer Johnson accounting, and a file type of spreadsheet; 4) a fourth content item with a topic of marketing monthly spending, a metadata tag of edited on Jul. 4, 2024, an access data packet of Jim Planck and Jennifer Johnson, an operation data packet of locked for editing, and a file name of marketing.exp.june.24; 5) a fifth content item with a file name of revenue_projections_Q1, a file type of pdf, a creator account of Jennifer Johnson, access data packets of Dave Smith CEO and Jennifer Johnson accounting, operation data packets of last edited by Jimmy Smith on Jun. 8, 2024, and an associated group of accounting; 6) a sixth content item with a file name of sales_forecast_analysis, a topic of revenue, an access data packet of Travis John, an operation data packet of adding Carson Smith for editing, a creator account of Travis John, and an associated group of sales; 7) a seventh content item with a file name of Q1_budget_engineering with a topic of quarter 1, an access data packet of Brett Johnson, an operation data packet, of sharing the document with Jennifer Johnson, and a creator account of Brett Johnson; 8) an eighth content item with a file name of Q1_budget_productdesign with a topic of quarter 1, an access data packet of Sara Lim, an operation data packet of locked for editing, and a creator account of Jim Li.

From the above illustration of content items and extracted raw facet data, the dynamic facet system 102 can determine a mapping between the facet content groups and the content items. Specifically, the dynamic facet system 102 can map the first and second content item to the first facet content group, the third and fourth content item to the second facet content group, the fifth and sixth content item to the third facet content group, and the seventh and eighth content item to the fourth facet content group.

As shown, in some embodiments, the dynamic facet system 102 can perform an act 308 of identifying an overlapping mapping. In other words, the dynamic facet system 102 determines that a specific content item maps to two different facet content groups. Specifically, the dynamic facet system 102 assigns a first content item with a first facet content group based on identifying the first content item of the plurality of content items that corresponds to the first facet content group and further assigns the first content item with a second facet content group based on identifying the first content item of the plurality of content items corresponds to the second facet content group. However, rather than assigning the same content item to multiple facet content groups, the dynamic facet system 102 determines a single facet content group to assign the content item.

In one or more embodiments, the dynamic facet system 102 identifies a facet content group to assign the content based on determining a string length of the facet content groups. As used herein, the term "string length" refers to a number of characters present in a string (e.g., letters, numbers, punctuation, spaces, and other symbols). Specifically, the dynamic facet system 102 compares the string lengths of facet content groups (e.g., with the same content item) and assigns the content item to the facet content group with the greater string length. In some embodiments, the string length for two facet content groups can be the same. For string lengths of the same length, the dynamic facet system can rely on lexicographical order (e.g., dictionary order, where the dynamic facet system 102 compares the first character of each string and iterates through the entire string until the string with a character that appears earlier in the alphabet is found) as a tie breaker.

In one or more embodiments, the dynamic facet system 102 can further distinguish the most frequent or most likely accessed folders in the content management system 106 prior to extracting the raw facet data and/or prior to receiving the interaction 302. In other words, the dynamic facet system 102 intelligently anticipates which folders are most likely to be accessed by on user account history. Thus, the dynamic facet system 102 can increase pre-processing time of extracting raw facet data by anticipating which folders are most likely to be accessed by a user of a client device and extracting the raw facet data in advance of the interaction 302.

In one or more embodiments, the dynamic facet system 102 can further remove personally identifiable information (PII) from extracted raw facet data. For instance, the dynamic facet system 102 can utilize machine learning models to process the extracted raw facet data and replace PII with placeholders. Specifically, the dynamic facet system 102 can use synthetic files or folder structures for content items that contain sensitive information. In other words, the dynamic facet system 102 identifies PII from extracted raw facet data, inserts placeholders to replace the PII, and determines facet content groups using the inserted placeholders and raw facet data that does not contain the PII.

Figure 4:
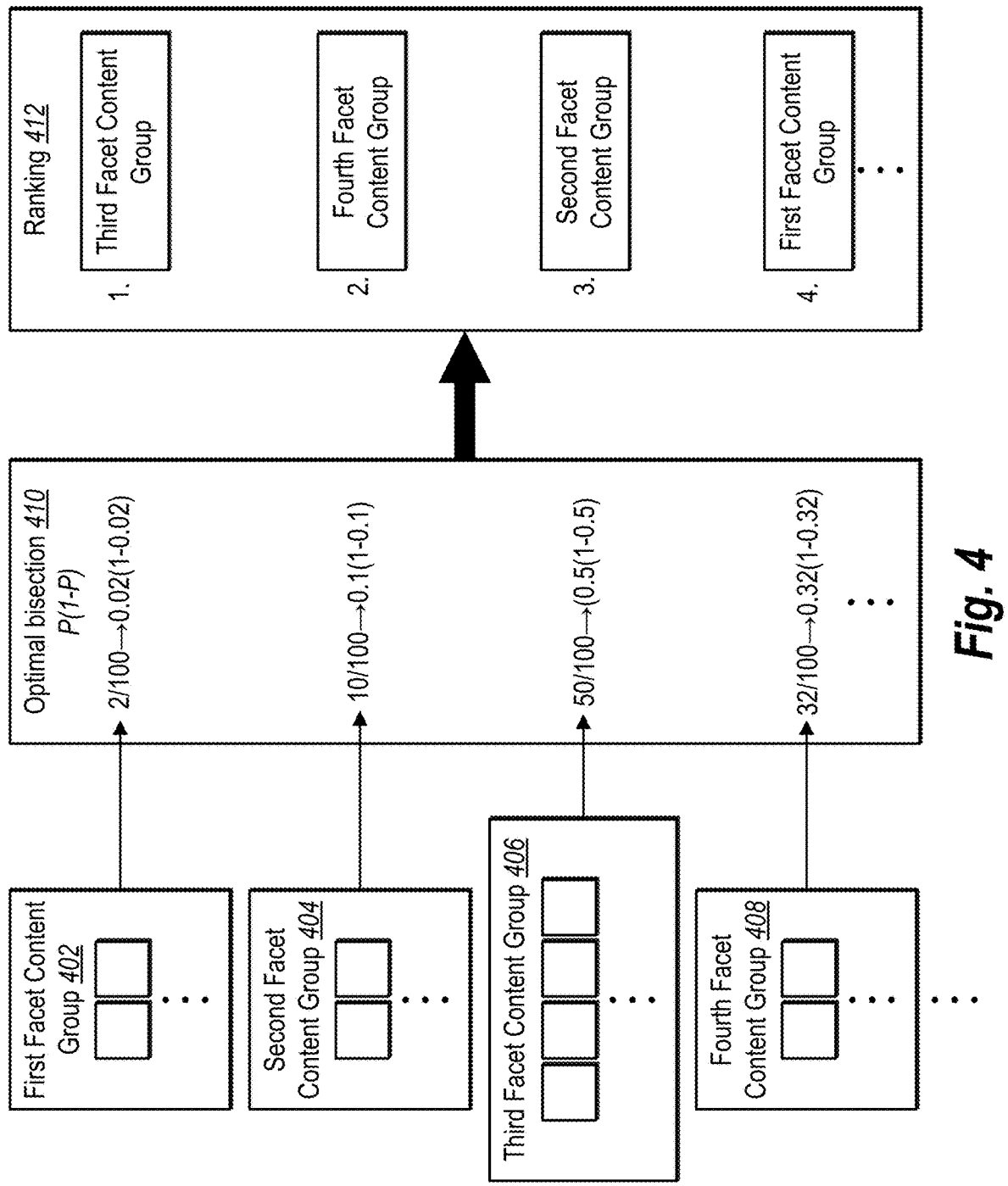
FIG. 4 illustrates an example diagram of the dynamic facet system determining a predefined bisection of the content items with various facet content groups in accordance with one or more embodiments.

As mentioned above, the dynamic facet system 102 determines a predefined bisection of a facet content group with a total content item population (e.g., a content item population relevant to an interaction with the content management system 106). FIG. 4 illustrates the dynamic facet system 102 ranking generated facet content groups according to a predefined bisection in accordance with one or more embodiments.

As shown in FIG. 4, the dynamic facet system 102 generates a first facet content group 402, a second facet content group 404, a third facet content group 406, and a fourth facet content group 408. Specifically, each of the generated facet content groups contain multiple content items. For instance, FIG. 4 shows the dynamic facet system 102 determining a predefined bisection 410 of the facet content groups with the content items. In other words, the dynamic facet system 102 determines whether the facet content groups contain a number of content items that fall within a threshold range.

As used herein, the term "threshold range" refers to an optimal percentage of the plurality of content items. Specifically, the dynamic facet system 102 establishes a threshold range of a mapping between content items and a specific facet content group. For instance, the threshold range can include a facet content group including between 30-60% of a plurality of content items (e.g., a candidate population of content items). To illustrate, a user of a client device selects a folder (e.g., design folder) in the content management system 106 and within the folder there is a plurality of content items. The dynamic facet system 102 can then generate one or more dynamic facets where the one or more dynamic facets contains a number of content items that is within the threshold range (e.g., 30-60% of the plurality of content items).

As mentioned above, the threshold range refers to an optimal percentage of the plurality of content items. As used herein, the term "predefined bisection" refers to the dynamic facet system 102 determining the threshold range. For instance, the dynamic facet system 102 determines the predefined bisection by using $p(1-p)$ (e.g., p is the number of files in the facet divided by the total number of content items relevant to a specific interaction in the content management system 106). In other words, the dynamic facet system 102 can preestablish an optimal or desired range for a number of content items for a dynamic folder relative to a population of content items. In one or more embodiments, the dynamic facet system 102 can collect data over time for interactions between client devices and dynamic facets and determine which dynamic facets are most interacted with (e.g., relative to other dynamic facets). In doing so, the dynamic facet system 102 can determine a desired/optimal range of content items for a dynamic facet. In some embodiments, the dynamic facet system 102 can set a preestablished range, such as between 40 and 60 percent of the population of content items (e.g., population of content items for a specific interaction, such as selecting a folder or certain view within the content management system 106). To illustrate, FIG. 4 shows the first facet content group 402 contains 2/100 content items which results in $0.02(1-0.02)=0.98$; the second facet content group 404 contains 10/100 which results in $0.1(1-0.1)=0.90$; the third facet content group 406 contains 50/100 which results in $0.5(1-0.5)=0.50$; and the fourth facet content group 408 contains 32/100 which results in $0.32(1-0.32)=0.68$.

According to the determined bisection of the facet content groups with the content items, the dynamic facet system 102 performs an act 412 of ranking the facet content groups. For instance, the dynamic facet system 102 can determine twenty facet content groups and rank the twenty facet content groups from best to worst (e.g., according to predefined bisection). As shown, the dynamic facet system 102 ranks the third facet content group 406 first, the fourth facet content group 408 second, the second facet content group 404 third and the first facet content group 402 fourth. Moreover, as mentioned above, the dynamic facet system 102 can identify a subset of the facet content groups. Specifically, from the ranking, the dynamic facet system 102 can take the top ten facet content groups. In some embodiments, the predefined bisection of two different groups is the same. In such instances, the dynamic facet system 102 can rely on the string length of the facet content groups as a tie breaker. Moreover, if the string length is also a tie, the dynamic facet system 102 can rely on lexicographic order.

In one or more embodiments, the dynamic facet system 102 can leverage one or more machine learning models to perform the act 412 of ranking the facet content groups on a user account basis. In other words, the dynamic facet system can personalize the ranking strategy. Specifically, the dynamic facet system can receive input from a user of a client device to prioritize facets that highlight team members/collaborators over other facets.

As mentioned above, the dynamic facet system 102 generates a facet prompt for a subset of facet content groups. FIG. 5 illustrates the dynamic facet system 102 generating a facet prompt and providing the facet prompt to a large language model in accordance with one or more embodiments.

FIG. 5 shows a facet prompt 502 that includes instructions to the large language model and an example. Specifically, the facet prompt 502 shows:

<s> [INST] You are a helpful organizer. You will be given a list of phrases along with their relative importance and you will identify 1-4 main themes. These themes should have a good balance of accuracy, coverage and distinctness. Return the answer in a json format where the key is the theme and the value list of the most prominent relevant phrases. If no obvious theme is identifiable then return an empty json "{{ }}".

For example, given phrases:

{{"Sales doc draft": 2, "2023FY sales": 4, "Budget Spreadsheet": 3, "previous budget jan": 4}} [/INST]

{{

"Sales": {Sales doc draft", "2023FY sales", "sales budget jan"},

"Budget": {"Budget Spreadsheet", "previous year budgeting", "sales budget jan"}

}}

</s>

Remember, only up to 4 themes, each of which contain 5 or fewer phrases. Keep to the most prominent themes and phrases only. Also return the JSON mapping ONLY and no other text. [INST] (input_string) [/INST].

In the above facet prompt, it shows an [INST] (input_string) [/INST} where the identified subset of facet content groups is inserted into the facet prompt. Specifically, the dynamic facet system 102 can provide the identified subset of a first facet content group, a second facet content group, a third facet content group, and a fourth facet content group with the mapped content items as input into the facet prompt 502. Moreover, the dynamic facet system 102 can provide the facet prompt 502 to the large language model 504. Based on the facet prompt 502, the dynamic facet system 102 utilizes the large language model 504 to generate a dynamic facet output 506.

As shown in FIG. 5, the dynamic facet output 506 reads:
"transportation": [
"nov 13 rideshare to EWR.pdf",
"nov 12 rideshare to hotel.pdf",
"rideshare home.pdf"],
],
"Accommodation": [
"Nail—Your November 13 stay at LUMA Hotel San Francisco is confirmed.pdf",
"nov 13 rideshare to hotel.pdf",
"Clove garden stay.jpg"

Thus, the dynamic facet system 102 generates the dynamic facet output 506 that can include a JSON mapping of generated dynamic facets with the content items from the facet content groups. Moreover, the dynamic facet system 102 can utilize the dynamic facet output 506 to cause a graphical user interface of a client device to display the dynamic facets. Additionally, in response to a selection of a dynamic facet, the dynamic facet system 102 causes the graphical user interface to display the associated content items. Although the above description describes the prompt and the output in terms of a JSON output, in some embodiments (e.g., after fine-tuning), the dynamic facet system generates the dynamic facet in a YAML output (e.g., Yet Another Markup Language), which is a human-readable data serialization format that is commonly used for configuration files and data exchange between languages with different data structures.

Although FIG. 5 shows the facet prompt 502 with an example, in some embodiments, the dynamic facet system 102 provides a zero-shot prompt as the facet prompt 502. In other words, in some embodiments, the dynamic facet system 102 does not provide any examples as part of the facet prompt 502. For instance, the dynamic facet system 102 can provide a one-shot example for fine-tuning the large language model 504. However, after fine-tuning, the dynamic facet system 102 can provide a zero-shot prompt (e.g., no example) to the large language model 504.

Additionally, although FIG. 5 shows the dynamic facet output 506 with single topics (e.g., transportation or accommodation), in some embodiments, the dynamic facet system 102 can generate dynamic facets with multiple topics. As used herein, the term "topic" refers to a specific subject, category, or attribute used to filter a plurality of content items. Specifically, a dynamic facet can contain a single topic or multiple topics. For instance, a dynamic facet can relate to "images and graphics" or to "John Smith and Sara Johnson." In particular, selecting a dynamic facet that includes multiple topics causes the interface of the content management system 106 to show all the content items associated with the multiple topics.

Moreover, in some embodiments, the dynamic facet system 102 can replace the facet prompt 502 with a series of facet prompts. Specifically, the dynamic facet system 102 can generate a prompt with instructions and then generate subsequent prompts with the facet content groups and the content items mapped to the facet content groups. In some embodiments, the dynamic facet system 102 can perform multiple parallel runs with facet prompts generated from the same instructions by different subsets of selected/identified facet content groups (e.g., and then use additional large language model to identify duplicate dynamic facets). Specifically, the dynamic facet system 102 can identify the top ten ranked facet content groups and generate a facet prompt for the top ten ranked facet content groups. Moreover, the dynamic facet system 102 can generate an additional facet prompt for the next ranked ten facet content groups. In doing so, the dynamic facet system 102 submits multiple facet prompts to the large language model 504 to generate multiple dynamic facet outputs. Thus, the dynamic facet system 102 can provide for display the dynamic facet outputs from the initial facet prompt and/or the dynamic facet outputs from the subsequent facet prompt.

In one or more embodiments, the dynamic facet system 102 can pre-compute facet descendants (e.g., a facet content group that branches or depends from another facet content group) and descendant content items for more efficiently identifying and displaying items in the interface as a user drills down through facets. In other words, the dynamic facet system 102 pre-computes facet descendants to determine additional dynamic facets for display when a user selects a generated dynamic facet.

Additionally, although FIG. 5 shows the dynamic facet system 102 using the large language model 504, in some embodiments, the dynamic facet system 102 hands-off the dynamic facet generation to a search interface system. For instance, after the dynamic facet system 102 generates the dynamic facets, the user of the client device can select a dynamic facet to view the associated content items. In some embodiments, the user of the client device may not see a desired content item within the dynamic facet. In some embodiments, the dynamic facet system provides a button element in the graphical user interface of the client device. In response to a selection of the button element, the dynamic facet system 102 can use a search interface system (e.g., a search interface of the content management system 106) to filter down a large volume of content items based on the instructions of the facet prompt (e.g., an autocomplete search query based on the facet prompt to continue retrieving additional content items).

In one or more embodiments, the dynamic facet system 102 further fine-tunes the large language model 504. For instance, the dynamic facet system 102 fine-tunes the large language model 504 to decrease latency, decrease a malformed output rate and to improve grouping/abstraction quality. For example, the dynamic facet system 102 can annotate data by utilizing sample collected user data, identify the top twenty facet content groups from the sampled collected user data, and provide a facet prompt to the large language model 504 to generate three dynamic facets for each request. Furthermore, the dynamic facet system 102 can then receive the output from the large language model 504 of the dynamic facets. Based on the generated dynamic facets, the dynamic facet system 102 can identify the "best" dynamic facet for each request (e.g., best relative to pre-established heuristics, the dynamic facet not being malformed, the dynamic facet not having too many groups, the dynamic facet not having too many facet content groups). Moreover, the dynamic facet system 102 can label the "best" dynamic facet for each request, the dynamic facet system 102. To illustrate, the dynamic facet system 102 can then provide the annotated data to the large language model 504 and the dynamic facet system 102 can save the merged weight models.

Figure 6:
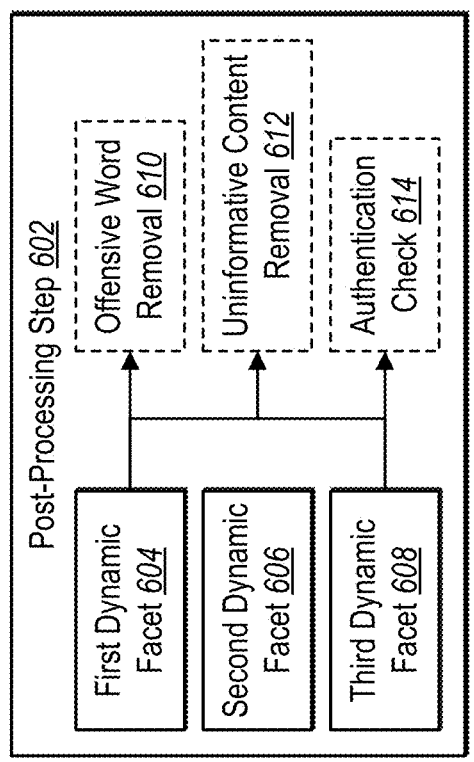
FIG. 6 illustrates an example diagram of the dynamic facet system performing post-processing steps in accordance with one or more embodiments.

As mentioned above, the dynamic facet system 102 performs various post-processing steps after generating the one or more dynamic facets. FIG. 6 illustrates the dynamic facet system 102 performing post-processing steps on the generated dynamic facets in accordance with one or more embodiments.

In one or more embodiments, after the dynamic facet system 102 generates the dynamic facets, the dynamic facet system 102 performs post-processing steps to flatten the initially determined mapping (e.g., converting a nested map of the facet content groups to content items and dynamic facets to facet content groups). Thus, the dynamic facet system 102 references the mapping between the facet content groups and the content items and the dynamic facets and the facet content groups to create a unified mapping to cause the graphical user interface to display the dynamic facets.

Moreover, FIG. 6 shows a first dynamic facet 604, a second dynamic facet 606, and a third dynamic facet 608. Specifically, FIG. 6 shows that in some embodiments, the dynamic facet system 102 performs an offensive word removal step 610 on the dynamic facets. For instance, an offensive word removal step 610 includes the dynamic facet system 102 checking the names of the dynamic facets and comparing them against a list of offensive words. For example, the dynamic facet system 102 identifies that one or more of the dynamic facets includes a name that is also on a list of offensive words (e.g., by comparing the name) and removes the offensive word from the dynamic facet. To illustrate, the dynamic facet system 102 can entirely remove the dynamic facet with the offensive word or the dynamic facet system 102 can re-generate a facet prompt (e.g., with instructions to not include the offensive word or variations of the offensive word) for the dynamic facet with the identified offensive word. In doing so, the dynamic facet system 102 can re-generate the dynamic facet without the offensive word.

As further shown, in some embodiments, the dynamic facet system 102 can perform an uninformative content removal step 612 to check if the dynamic facets contain uninformative content. Specifically, the dynamic facet system 102 can process all the content items associated with a dynamic facet and determine whether a threshold amount (e.g., 50%) of the content includes backup file or other uninteresting or uninformative files. For example, the dynamic facet system 102 can utilize a machine learning model to generate embeddings of the content within the content items for a dynamic facet and determine whether the files are repetitive or not useful (e.g., the content item has not content or very little content). For instance, the dynamic facet system 102 compares the generated embeddings against embeddings for content deemed uninformative/uninteresting to identify such content.

Moreover, in some embodiments, the dynamic facet system 102 can perform an authentication check 614 on the dynamic facets. In other words, the dynamic facet system 102 can determine whether a user account has permissions. As used herein, the term "permissions" refers to access rights for a user account and/or client device to access one or more content items and particular types of operations the user account/client device can perform on the one or more content items. For instance, if the dynamic facet system 102 determines that a user account (e.g., corresponding to a client device performing one or more interactions with the content management system 106) does not have access to one or more content items for one or more dynamic facets, the dynamic facet system 102 can remove the one or more content items from the one or more dynamic facets.

In one or more embodiments, the dynamic facet system 102 can perform the post-processing steps 602 after providing for display on a graphical user interface the first dynamic facet 604, the second dynamic facet 606, and the third dynamic facet 608. In some embodiments, the dynamic facet system 102 performs the post-processing steps 602 prior to providing for display on a graphical user interface the dynamic facets.

Figure 7A:
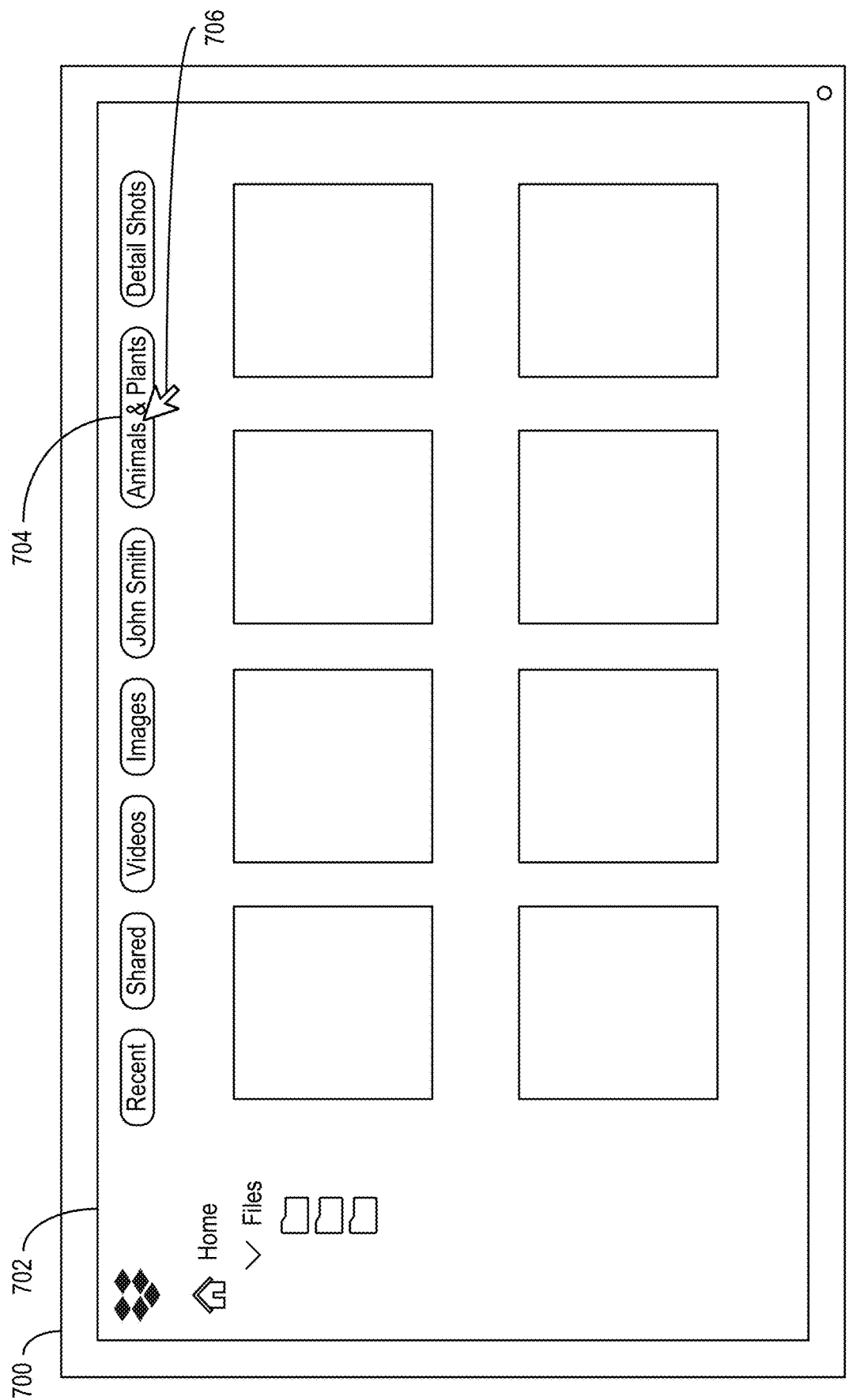
FIGS. 7A-7B illustrates an example diagram of the dynamic facet system providing a graphical user interface for display with dynamic facets that include multiple topics and additional dynamic facets in accordance with one or more embodiments.
Figure 7B:
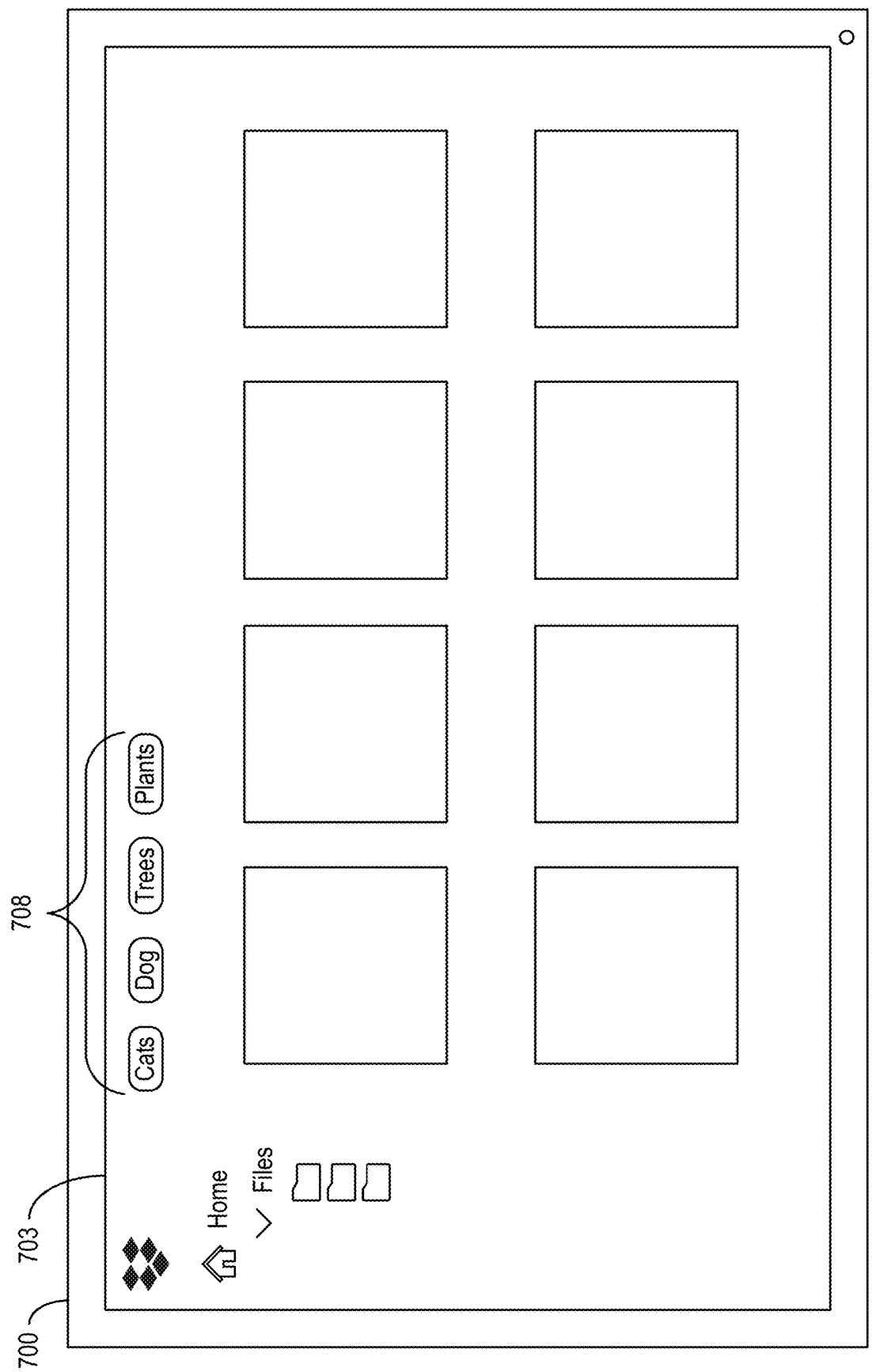

As shown in FIGS. 7A-7B, the dynamic facet system 102 provides for display a graphical user interface to a client device that shows one or more dynamic facets in accordance with one or more embodiments. For example, FIG. 7A shows a multi-topic dynamic facet along with single topic dynamic facets. Specifically, FIG. 7A shows a client device 700 with a graphical user interface 702 that shows multiple predefined facets (e.g., recent, shared, videos, images) and also shows single topic dynamic facets (e.g., John Smith and Detail Shots). In addition, the dynamic facet system 102 shows a multi-topic dynamic facet 704 (e.g., Animals & Plants).

To illustrate, as described above the dynamic facet system 102 can extract raw facet data from a plurality of content items, determine facet content groups (e.g., animal facet content group and plant facet content group), and further generate a facet prompt for a subset of the determined facet content groups. As mentioned above, the dynamic facet system 102 can provide the facet prompt to a large language model to generate the multi-topic dynamic facet 704 of animals and plants. Thus, in some embodiments, the dynamic facet system 102 creates dynamic facets that contain two distinct topics that may be tangentially related.

In addition, FIG. 7A shows the dynamic facet system 102 receiving a selection 706 of the multi-topic dynamic facet 704. In response to the selection 706, the dynamic facet system 102 can transition to a graphical user interface 703 shown in FIG. 7B. Specifically, the graphical user interface 703 shown in FIG. 7B includes the content items associated with the animal facet content group and the plant facet content group. For instance, FIG. 7B shows additional dynamic facets 708 (e.g., cats, dogs, trees, and plants). Specifically, based on the already extracted raw facet data, the dynamic facet system 102 further determines additional facet content groups for the content item associated with the initially selected dynamic facet (e.g., the multi-topic dynamic facet 704). Moreover, the dynamic facet system 102 can rank the additional facet content groups, create an additional facet prompt (e.g., for a subset of the additional facet content groups) and further generate the additional dynamic facets 708.

In one or more embodiments, the dynamic facet system 102 can provide an option for a user of a client device to pin a dynamic facet to the content management system 106. In other words, the dynamic facet system 102 can make one or more dynamic facets a permanent fixture of a user account (e.g., until it is removed). For instance, the dynamic facet system 102 can provide an option for a user of a client device to pin a dynamic facet for a certain time length (e.g., a week, a month, indefinitely). Moreover, in response to a user of a client device pinning a dynamic facet, the dynamic facet system 102 can prioritize ranking similar types of facet content groups (e.g., relative to the pinned dynamic facet) in subsequent facet content group rankings.

FIGS. 1-7, the corresponding text, and the examples provide a number of different systems and methods for generating dynamic facets using a large language model. In addition to the foregoing, implementations can also be described in terms of flowcharts comprising acts steps in a method for accomplishing a particular result. For example, FIG. 8 illustrates an example series of acts for generating dynamic facets.

Figure 8:
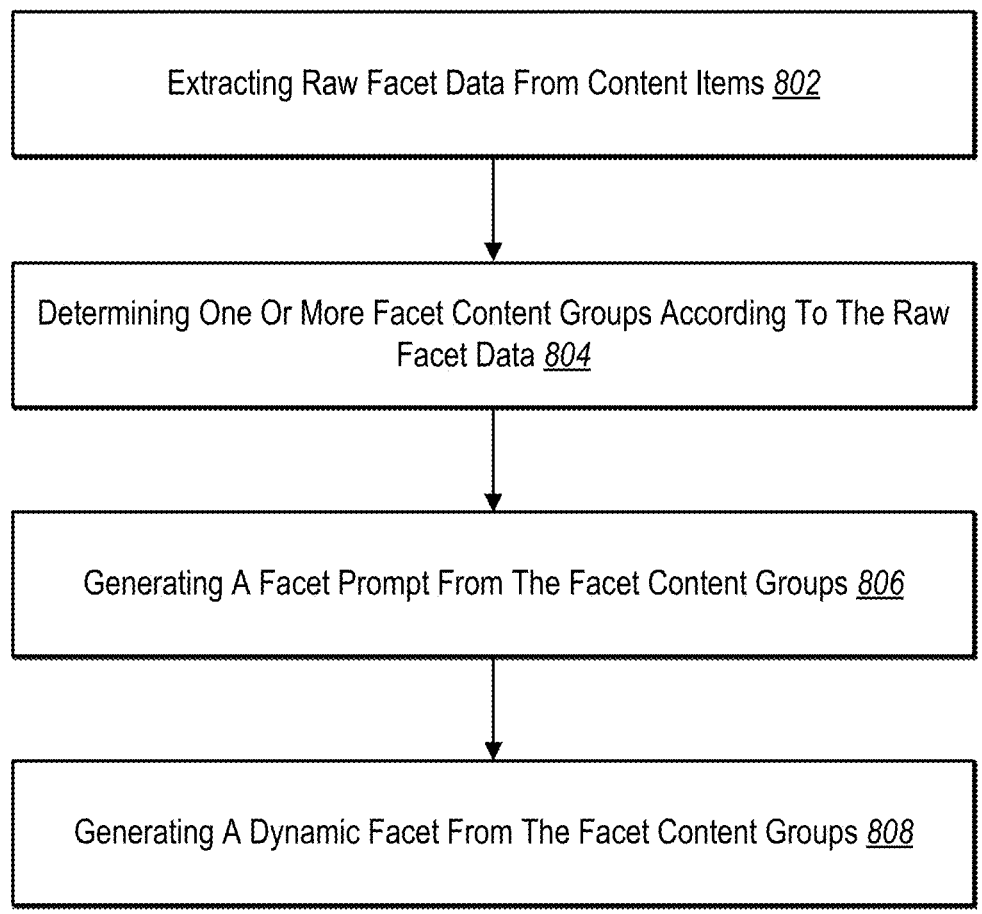
FIG. 8 illustrates an example series of acts performed by the dynamic facet system in accordance with one or more embodiments.

While FIG. 8 illustrates acts according to certain implementations, alternative implementations may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further implementations, a system can perform the acts of FIG. 8.

As illustrated in FIG. 8, a series of acts 800 that may include an act 802 of extracting raw facet data from content items, an act 804 of determining one or more facet content groups according to the raw facet data, an act 806 of generating a facet prompt from the facet content groups, and an act 808 of generating a dynamic facet from the facet content groups.

In particular the act 802 includes extracting raw facet data from a plurality of content items stored in a content management system. Further, the act 804 includes determining one or more facet content groups by grouping the plurality of content items according to the raw facet data. Moreover, the act 806 includes generating a facet prompt from the one or more facet content groups. Furthermore, the act 808 includes generating a dynamic facet by providing the facet prompt to a large language model.

Further, in one or more embodiments, the series of acts 800 includes extracting one or more metadata tags for a content item of the plurality of content items comprising a topic of the content item. Additionally, in one or more embodiments, the series of acts 800 includes extracting access data packets for the content item that indicates one or more client devices that accessed the content item. Moreover, in one or more embodiments, the series of acts 800 includes extracting operation data packets for the content item that indicates one or more operations performed on the content item.

Furthermore, in one or more embodiments, the series of acts 800 includes generating, utilizing a machine learning classification model, classes of the plurality of content items. Additionally, in one or more embodiments, the series of acts 800 includes extracting the classes of the plurality of content items as the raw facet data. Further, in one or more embodiments, the series of acts 800 includes generating a mapping for the one or more facet content groups to the plurality of content items by assigning a first content item with a first facet content group based on identifying the first content item of the plurality of content items corresponds to the first facet content group. Moreover, in one or more embodiments, the series of acts 800 includes assigning a second content item with a second facet content group based on identifying the second content item of the plurality of content items corresponds to the second facet content group.

Further, in one or more embodiments, the series of acts 800 includes generating a mapping for the one or more facet content groups to the plurality of content items by assigning a first content item with a first facet content group based on identifying the first content item of the plurality of content items that corresponds to the first facet content group. Moreover, in one or more embodiments, the series of acts 800 includes assigning the first content item with a second facet content group based on identifying the first content item of the plurality of content items corresponds to the second facet content group. Additionally, in one or more embodiments, the series of acts 800 includes determining a string length of the first facet content group is greater than a string length of the second facet content group. In one or more embodiments, the series of acts 800 includes based on the string length of the first facet content group, assigning the first content item to the first facet content group and not to the second facet content group.

Moreover, in one or more embodiments, the series of acts 800 includes ranking the one or more facet content groups to identify a subset of facet content groups by determining that a number of content items mapped to a first facet content group falls within a threshold range, the threshold range indicating a predefined bisection of the plurality of content items with the first facet content group. Further, in one or more embodiments, the series of acts 800 includes determining a number of content items mapped to a second facet content group does not fall within the threshold range. Additionally, in one or more embodiments, the series of acts 800 includes ranking the first facet content group above the second facet content group.

In one or more embodiments, the series of acts 800 includes selecting a subset of the one or more facet content groups based on a ranking of the one or more facet content groups. Further, in one or more embodiments, the series of acts 800 includes generating a facet prompt for the subset of the one or more facet content groups, the facet prompt comprising instructions for the large language model to determine the dynamic facet that includes content items corresponding to the subset of the one or more facet content groups. Moreover, in one or more embodiments, the series of acts 800 includes providing, for display on a graphical user interface of a client device, the dynamic facet that corresponds to a first facet content group and a second facet content group. In one or more embodiments, the series of acts 800 includes in response to receiving a selection of the dynamic facet by the client device, providing, for display on the graphical user interface, content items associated with the first facet content group and the second facet content group.

Further, in one or more embodiments, the series of acts 800 includes generating the dynamic facet comprising a first facet content group and a second facet content group, wherein the first facet content group relates to a first topic and the second facet content group relates to a second topic. Moreover, in one or more embodiments, the series of acts 800 includes providing, for display on a graphical user interface of a client device the dynamic facet comprising the first topic and the second topic, wherein the first topic differs from the second topic. Additionally, in one or more embodiments, the series of acts 800 includes in response to receiving a selection of the dynamic facet by the client device, causing the graphical user interface to update and display content items associated with the first facet content group and the second facet content group.

In one or more embodiments, the series of acts 800 includes extracting raw facet data from a plurality of content items stored in a content management system. Moreover, in one or more embodiments, the series of acts 800 includes determining a plurality of facet content groups by grouping the plurality of content items according to the raw facet data. Furthermore, in one or more embodiments, the series of acts 800 includes identify a subset of the plurality of facet content groups based on ranking the plurality of facet content groups according to a threshold range of content items associated with each of the plurality of facet content groups. In one or more embodiments, the series of acts 800 includes generating a facet prompt from the subset of the plurality of facet content groups. In one or more embodiments, the series of acts 800 includes generating a dynamic facet by providing the facet prompt to a large language model. Moreover, in one or more embodiments, the series of acts 800 includes providing the dynamic facet to a graphical user interface of a client device.

Additionally, in one or more embodiments, the series of acts 800 includes extracting one or more metadata tags for a content item of the plurality of content items comprising a topic of the content item. Moreover, in one or more embodiments, the series of acts 800 includes extracting access data packets for the content item that indicates one or more client devices that accessed the content item. Further, in one or more embodiments, the series of acts 800 includes extracting a subfolder location for a content item of the plurality of content items.

In one or more embodiments, the series of acts 800 includes extracting one or more word combinations from a file name for a content item of the plurality of content items. Further, in one or more embodiments, the series of acts 800 includes extracting a file type for the content item of the plurality of content items. Moreover, in one or more embodiments, the series of acts 800 includes extracting operation data packets for the content item that indicates one or more operations performed on the content item.

Additionally, in one or more embodiments, the series of acts 800 includes generate the dynamic facet in response to a user of a client device selecting a folder in the content management system. Further, in one or more embodiments, the series of acts 800 includes determining permissions of a client device to access one or more content items associated with the dynamic facet. Moreover, in one or more embodiments, the series of acts 800 includes determining that the client device does not have permission to access a content item associated with the dynamic facet. In one or more embodiments the series of acts 800 includes removing the content item from the dynamic facet.

Moreover, in one or more embodiments, the series of acts 800 includes in response to receiving a selection of the dynamic facet by a client device, generating one or more additional facet content groups by grouping one or more content items of the dynamic facet according to the raw facet data. Further, in one or more embodiments, the series of acts 800 includes generating an additional facet prompt from the one or more additional facet content groups. In one or more embodiments, the series of acts 800 includes generating an additional dynamic facet by providing the additional facet prompt to the large language model.

In one or more embodiments, the series of acts 800 includes determining one or more facet content groups by grouping the plurality of content items according to the raw facet data. Further, in one or more embodiments, the series of acts 800 includes generating a facet prompt from the one or more facet content groups. Moreover, in one or more embodiments, the series of acts 800 includes generating a dynamic facet by providing the facet prompt to a large language model. In one or more embodiments, the series of acts 800 includes providing, for display on a graphical user interface of a client device the dynamic facet.

In one or more embodiments, the series of acts 800 includes extracting access data packets for a content item that indicates one or more client devices that accessed the content item. Further, in one or more embodiments, the series of acts 800 includes extracting operation data packets for the content item that indicates one or more operations performed on the content item. Moreover, in one or more embodiments, the series of acts 800 includes extract a subfolder location for the content item of the plurality of content items.

In one or more embodiments, the series of acts 800 includes assign a first content item with a first facet content group based on identifying the first content item of the plurality of content items corresponds to the first facet content group. In one or more embodiments, the series of acts 800 includes assigning a second content item with a second facet content group based on identifying the second content item of the plurality of content items corresponds to the second facet content group. Further, in one or more embodiments, the series of acts 800 includes assign a third content item with a third facet content group based on identifying the third content item of the plurality of content items corresponds to the third facet content group.

Moreover, in one or more embodiments, the series of acts 800 includes determine that a number of content items mapped to a first facet content group falls within a threshold range, the threshold range indicating a predefined bisection of the plurality of content items with the first facet content group. In one or more embodiments, the series of acts 800 includes determining a number of content items mapped to a second facet content group does not fall within the threshold range. Further, in one or more embodiments, the series of acts 800 includes ranking the first facet content group above the second facet content group.

Moreover, in one or more embodiments, the series of acts 800 includes selecting a subset of the one or more facet content groups based on a ranking of the one or more facet content groups. In one or more embodiments, the series of acts 800 includes generating a facet prompt for the subset of the one or more facet content groups, the facet prompt comprising instructions for the large language model to determine the dynamic facet that includes content items corresponding to the subset of the one or more facet content groups.

The components of the dynamic facet system 102 can include software, hardware, or both. For example, the components of the dynamic facet system 102 can include one or more instructions stored on a computer-readable storage medium and executable by processors of one or more computing devices. When executed by one or more processors, the computer-executable instructions of the dynamic facet system 102 can cause a computing device to perform the methods described herein. Alternatively, the components of the dynamic facet system 102 can comprise hardware, such as a special purpose processing device to perform a certain function or group of functions. Additionally or alternatively, the components of the dynamic facet system 102 can include a combination of computer-executable instructions and hardware.

Furthermore, the components of the dynamic facet system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the dynamic facet system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
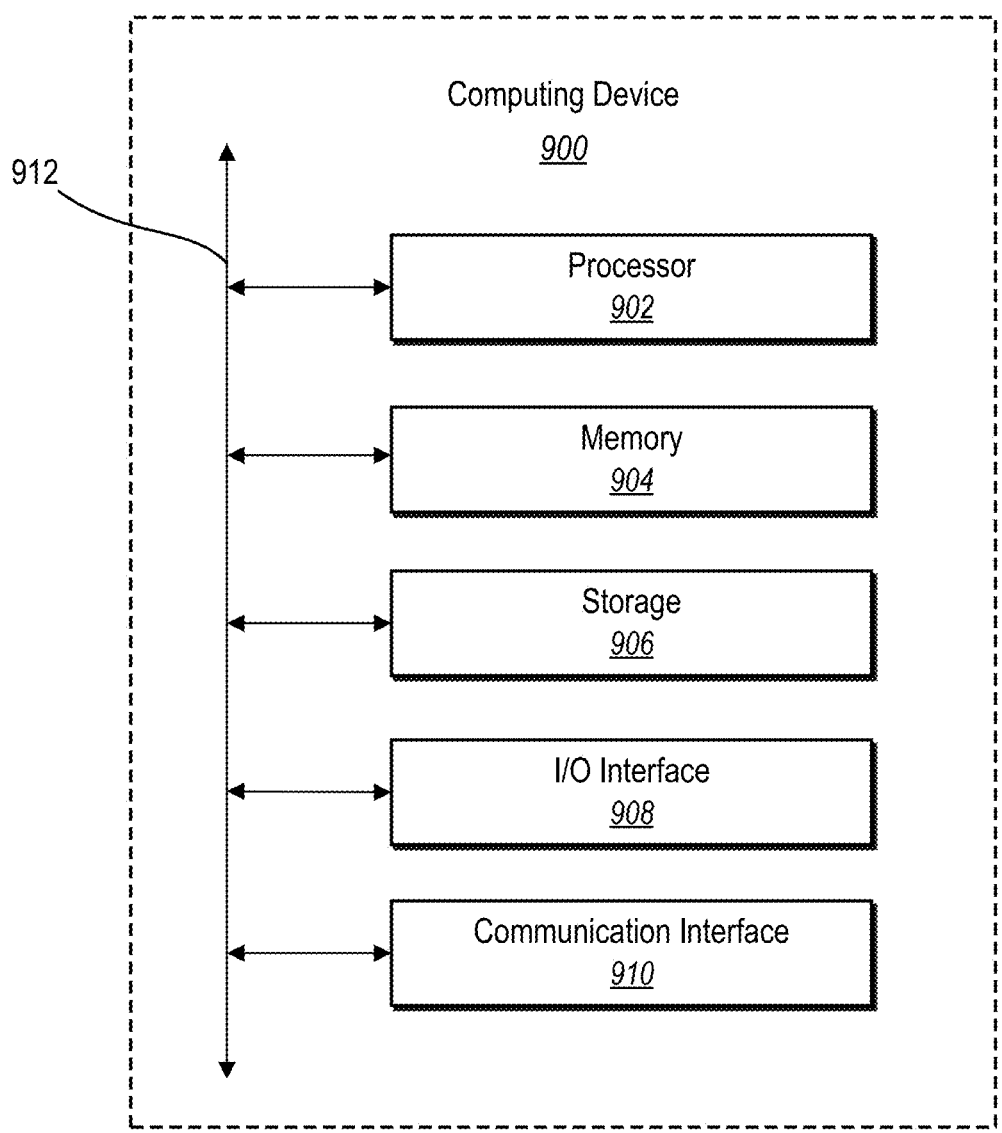
FIG. 9 illustrates a block diagram of an exemplary computing device in accordance with one or more embodiments.

FIG. 9 illustrates a block diagram of exemplary computing device 900 (e.g., the server(s) 104, the server(s) 116, and/or the client device 112) that may be configured to perform one or more of the processes described above. One will appreciate that server(s) 104 and/or the client device 112 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other implementations. Furthermore, in certain implementations, computing device 900 can include fewer components than those shown in FIG. 9. Components of computing device 900 shown in FIG. 9 will now be described in additional detail.

In particular implementations, processor 902 includes hardware for executing instructions, such as those making up a computer program. As an example, and not by way of limitation, to execute instructions, processor 902 may retrieve (or fetch) the instructions from an internal register, an internal cache, memory 904, or storage device 906 and decode and execute them. In particular implementations, processor 902 may include one or more internal caches for data, instructions, or addresses. As an example, and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular implementations, storage device 906 is non-volatile, solid-state memory. In other implementations, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
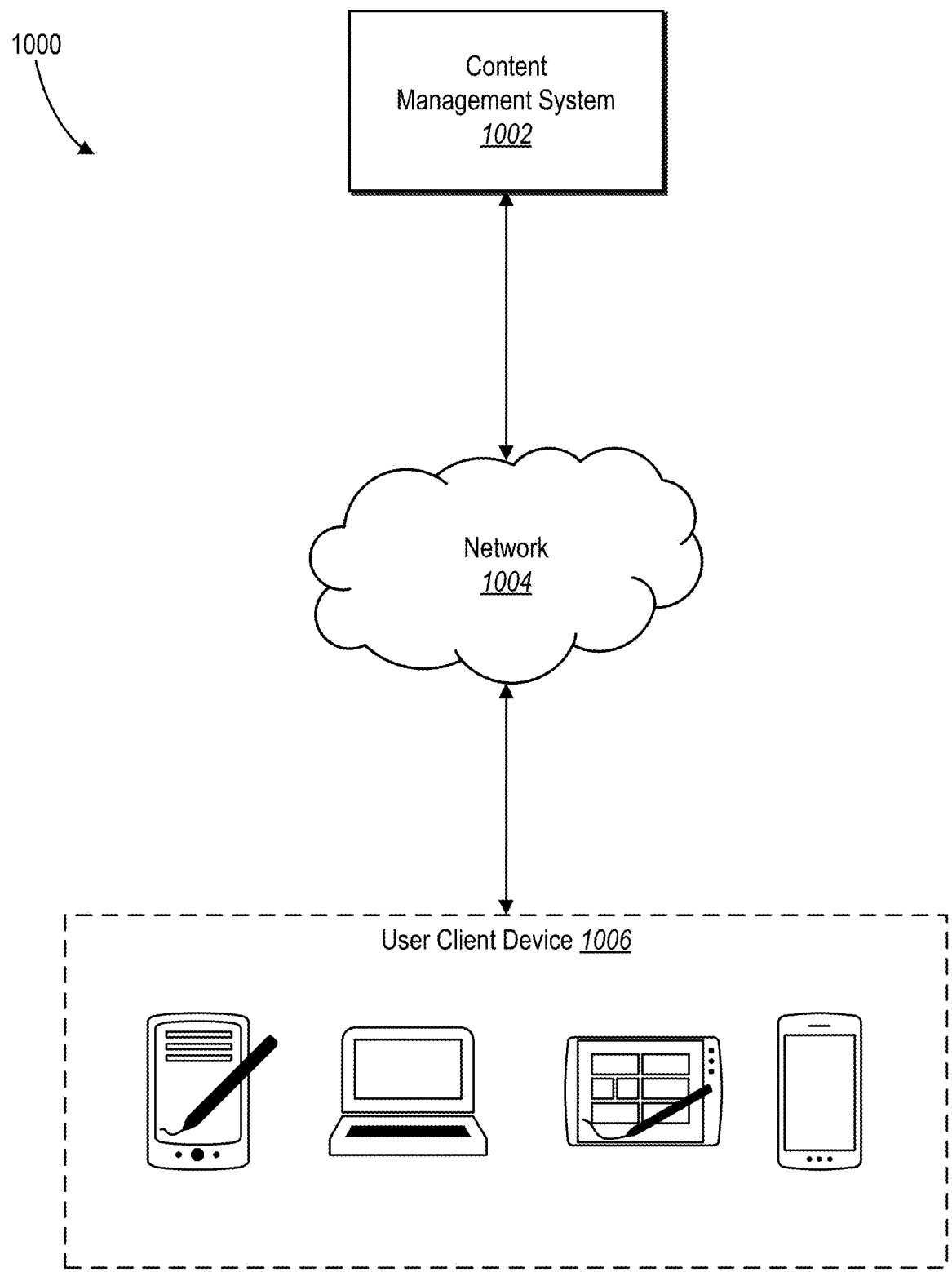
FIG. 10 illustrates an example environment of a networking system having the dynamic facet system in accordance with one or more embodiments.

FIG. 10 is a schematic diagram illustrating environment 1000 within which one or more implementations of the dynamic facet system 102 can be implemented. For example, the dynamic facet system 102 may be part of a content management system 1002 (e.g., the content management system 106). Content management system 1002 may generate, store, manage, receive, and send digital content (such as digital content items). For example, content management system 1002 may send and receive digital content to and from client device of client devices 1006 by way of network 1004. In particular, content management system 1002 can store and manage a collection of digital content. Content management system 1002 can manage the sharing of digital content between computing devices associated with a plurality of users. For instance, content management system 1002 can facilitate a user sharing a digital content with another user of content management system 1002.

In particular, content management system 1002 can manage synchronizing digital content across multiple client devices 1006 associated with one or more users. For example, a user may edit digital content using a client device of the client device 1006. The content management system 1002 can cause client device of the client devices 1006 to send the edited digital content to content management system 1002. Content management system 1002 then synchronizes the edited digital content on one or more additional computing devices.

In addition to synchronizing digital content across multiple devices, one or more implementations of content management system 1002 can provide an efficient storage option for users that have large collections of digital content. For example, content management system 1002 can store a collection of digital content on content management system 1002, while the client device of the client devices 1006 only stores reduced-sized versions of the digital content. A user can navigate and browse the reduced-sized versions (e.g., a thumbnail of a digital image) of the digital content on client device of the client devices 1006. In particular, one way in which a user can experience digital content is to browse the reduced-sized versions of the digital content on client device of client devices 1006.

Another way in which a user can experience digital content is to select a reduced-size version of digital content to request the full- or high-resolution version of digital content from content management system 1002. In particular, upon a user selecting a reduced-sized version of digital content, client device of client devices 1006 sends a request to content management system 1002 requesting the digital content associated with the reduced-sized version of the digital content. Content management system 1002 can respond to the request by sending the digital content to client device of client devices 1006. Client device of client devices 1006, upon receiving the digital content, can then present the digital content to the user. In this way, a user can have access to large collections of digital content while minimizing the amount of resources used on client device of client devices 1006.

client device of client devices 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1006 may access content management system 1002.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:
1. A system comprising:
  at least one processor; and
  a non-transitory computer-readable medium storing instructions which, when executed by the at least one processor, cause the system to:
    prior to a client device searching a content management system and in response to the client device navigating the content management system;
    extract raw facet data from a plurality of content items stored in the content management system, wherein navigating the content management system comprises a user of the client device selecting a folder or sub-folder within the content management system;
    determine a plurality of facet content groups by grouping the plurality of content items according to the raw facet data;
    identify a subset of the plurality of facet content groups based on ranking the plurality of facet content groups according to a threshold range of content items associated with each of the plurality of facet content groups;
    generate a facet prompt from the subset of the plurality of facet content groups, wherein the facet prompt includes instructions to a large language model that are created in response to the client device navigat- ing the content management system and prior to the client device performing the search of the content management system;

generate a dynamic facet by providing the facet prompt to the large language model, wherein the facet prompt comprises the subset of the plurality of facet content groups; and provide the dynamic facet to a graphical user interface of the client device, wherein the dynamic facet is selectable by the client device.

2. The system of claim 1, further storing instructions which, when executed by the at least one processor, cause the system to extract the raw facet data from the plurality of content items prior to the client device searching the content management system by:

extracting one or more metadata tags for a content item of the plurality of content items comprising a topic of the content item;

extracting access data packets for the content item that indicates one or more client devices that accessed the content item; or extracting a subfolder location for a content item of the plurality of content items.

3. The system of claim 1, further storing instructions which, when executed by the at least one processor, cause the system to extract the raw facet data from the plurality of content items prior to the client device searching the content management system by:

extracting one or more word combinations from a file name for a content item of the plurality of content items;

extracting a file type for the content item of the plurality of content items; or extracting operation data packets for the content item that indicates one or more operations performed on the content item.

4. The system of claim 1, further storing instructions, which when executed by the at least one processor cause the system to:

generate the dynamic facet by generating the facet prompt that includes instructions to the large language model to abstract groupings from the subset of the plurality of facet content groups, wherein the dynamic facet is generated as part of pre-processing steps performed prior to the client device searching the content management system.

5. The system of claim 1, further storing instructions, which when executed by the at least one processor cause the system to:

determine permissions of a client device to access one or more content items associated with the dynamic facet;

determine that the client device does not have permission to access a content item associated with the dynamic facet; and remove the content item from the dynamic facet.

6. The system of claim 1, further storing instructions, which when executed by the at least one processor cause the system to:

in response to receiving a selection of the dynamic facet by a client device, generate one or more additional facet content groups by grouping one or more content items of the dynamic facet according to the raw facet data;

generate an additional facet prompt from the one or more additional facet content groups; and generate an additional dynamic facet by providing the additional facet prompt to the large language model.

7. A computer-implemented method comprising:

prior to a client device searching a content management system and in response to a client device navigating a content management system, extracting raw facet data from a plurality of content items stored in the content management system;

determining one or more facet content groups by grouping the plurality of content items according to the raw facet data;

generating a facet prompt comprising the one or more facet content groups, wherein the facet prompt includes instructions to a large language model that are created in response to the client device navigating the content management system and prior to the client device performing the search of the content management system; and generating a dynamic facet by providing the facet prompt to the large language model, wherein the facet prompt comprises a subset of the one or more facet content groups.

8. The computer-implemented method of claim 7, wherein extracting the raw facet data from the plurality of content items comprises at least one of:

extracting one or more metadata tags for a content item of the plurality of content items comprising a topic of the content item;

extracting access data packets for the content item that indicates one or more client devices that accessed the content item; or extracting operation data packets for the content item that indicates one or more operations performed on the content item.

9. The computer-implemented method of claim 7, wherein extracting the raw facet data from the plurality of content items comprises at least one of:

generating, utilizing a machine learning classification model, classes of the plurality of content items; and extracting the classes of the plurality of content items as the raw facet data.

10. The computer-implemented method of claim 7, wherein determining the one or more facet content groups further comprises generating a mapping for the one or more facet content groups to the plurality of content items by:

assigning a first content item with a first facet content group based on identifying the first content item of the plurality of content items corresponds to the first facet content group; and assigning a second content item with a second facet content group based on identifying the second content item of the plurality of content items corresponds to the second facet content group.

11. The computer-implemented method of claim 7, wherein determining the one or more facet content groups further comprises generating a mapping for the one or more facet content groups to the plurality of content items by:

assigning a first content item with a first facet content group based on identifying the first content item of the plurality of content items that corresponds to the first facet content group;

assigning the first content item with a second facet content group based on identifying the first content item of the plurality of content items corresponds to the second facet content group;

determining a string length of the first facet content group is greater than a string length of the second facet content group; and based on the string length of the first facet content group, assigning the first content item to the first facet content group and not to the second facet content group.

12. The computer-implemented method of claim 7, further comprising ranking the one or more facet content groups to identify a subset of facet content groups by:
   determining that a number of content items mapped to a first facet content group falls within a threshold range, the threshold range indicating a predefined bisection of the plurality of content items with the first facet content group;
   determining a number of content items mapped to a second facet content group does not fall within the threshold range; and
   ranking the first facet content group above the second facet content group.

13. The computer-implemented method of claim 7, further comprising:
   selecting a subset of the one or more facet content groups based on a ranking of the one or more facet content groups; and
   generating a facet prompt for the subset of the one or more facet content groups, the facet prompt comprising instructions for the large language model to determine the dynamic facet that includes content items corresponding to the subset of the one or more facet content groups,
   wherein the facet prompt is generated as a part of pre-processing steps performed prior to the client device searching the content management system.

14. The computer-implemented method of claim 7, further comprising:
   providing, for display on a graphical user interface of a client device, the dynamic facet that corresponds to a first facet content group and a second facet content group; and
   in response to receiving a selection of the dynamic facet by the client device, providing, for display on the graphical user interface, content items associated with the first facet content group and the second facet content group.

15. The computer-implemented method of claim 7, wherein generating the dynamic facet by providing the facet prompt to the large language model further comprises:
   generating the dynamic facet comprising a first facet content group and a second facet content group, wherein the first facet content group relates to a first topic and the second facet content group relates to a second topic;
   providing, for display on a graphical user interface of a client device the dynamic facet comprising the first topic and the second topic, wherein the first topic differs from the second topic; and
   in response to receiving a selection of the dynamic facet by the client device, causing the graphical user interface to update and display content items associated with the first facet content group and the second facet content group.

16. A non-transitory computer-readable medium storing executable instructions which, when executed by at least one processor, cause the at least one processor to:
   prior to a client device searching a content management system and in response to a client device navigating a content management system, extract raw facet data from a plurality of content items stored in the content management system;
   determine one or more facet content groups by grouping the plurality of content items according to the raw facet data;
   generate a facet prompt from the one or more facet content groups, wherein the facet prompt includes instructions to a large language model that are created in response to the client device navigating the content management system and prior to the client device performing the search of the content management system;
   generate a dynamic facet by providing the facet prompt to the large language model, wherein the facet prompt comprises a subset of the one or more facet content groups; and
   provide, for display on a graphical user interface of the client device the dynamic facet, wherein the dynamic facet is selectable by the client device.

17. The non-transitory computer-readable medium of claim 16, further storing instructions which, when executed by the at least one processor, cause the at least one processor to:
   extract access data packets for a content item that indicates one or more client devices that accessed the content item;
   extract operation data packets for the content item that indicates one or more operations performed on the content item; and
   extract a subfolder location for the content item of the plurality of content items.

18. The non-transitory computer-readable medium of claim 16, further storing instructions which, when executed by the at least one processor, cause the at least one processor to:
   assign a first content item with a first facet content group based on identifying the first content item of the plurality of content items corresponds to the first facet content group;
   assign a second content item with a second facet content group based on identifying the second content item of the plurality of content items corresponds to the second facet content group; and
   assign a third content item with a third facet content group based on identifying the third content item of the plurality of content items corresponds to the third facet content group.

19. The non-transitory computer-readable medium of claim 16, further storing instructions which, when executed by the at least one processor, cause the at least one processor to:
   determine that a number of content items mapped to a first facet content group falls within a threshold range, the threshold range indicating a predefined bisection of the plurality of content items with the first facet content group;
   determine a number of content items mapped to a second facet content group does not fall within the threshold range; and
   rank the first facet content group above the second facet content group.

20. The non-transitory computer-readable medium of claim 16, further storing instructions which, when executed by the at least one processor, cause the at least one processor to:
   select a subset of the one or more facet content groups based on a ranking of the one or more facet content groups; and generate a facet prompt for the subset of the one or more facet content groups, the facet prompt comprising instructions for the large language model to determine the dynamic facet that includes content items corresponding to the subset of the one or more facet content groups.

* * * * *